United States Patent
Ushiku et al.

(10) Patent No.: US 7,702,413 B2
(45) Date of Patent: Apr. 20, 2010

(54) SEMICONDUCTOR DEVICE MANUFACTURING SYSTEM AND METHOD FOR MANUFACTURING SEMICONDUCTOR DEVICES INCLUDING CALCULATING OXIDE FILM THICKNESS USING REAL TIME SIMULATOR

(75) Inventors: Yukihiro Ushiku, Yokohama (JP); Akira Ogawa, Yokohama (JP); Hidenori Kakinuma, Kawasaki (JP); Shunji Shuto, Oita (JP); Masahiro Abe, Yokohama (JP); Tatsuo Akiyama, Tokyo (JP); Shigeru Komatsu, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1009 days.

(21) Appl. No.: 10/935,430

(22) Filed: Sep. 8, 2004

(65) Prior Publication Data
US 2005/0095774 A1     May 5, 2005

(30) Foreign Application Priority Data
Sep. 8, 2003   (JP)   ............................ P2003-355684
Jun. 28, 2004  (JP)   ............................ P2004-189971

(51) Int. Cl.
*G06F 19/00*   (2006.01)
(52) U.S. Cl. ...................................... 700/121; 438/770
(58) Field of Classification Search ................. 700/121, 700/108; 438/770; 703/6
See application file for complete search history.

(56) References Cited

U.S. PATENT DOCUMENTS

| | | | |
|---|---|---|---|
| 5,451,784 A * | 9/1995 | Loewenhardt et al. | ...... 250/305 |
| 5,511,005 A * | 4/1996 | Abbe et al. | .................... 702/84 |
| 5,711,843 A | 1/1998 | Jahns | |
| 6,408,219 B2 | 6/2002 | Lamey et al. | |
| 6,691,068 B1 * | 2/2004 | Freed et al. | ................... 702/187 |
| 6,759,253 B2 * | 7/2004 | Usui et al. | ....................... 438/6 |
| 6,820,028 B2 * | 11/2004 | Ye et al. | ...................... 702/117 |
| 6,830,650 B2 * | 12/2004 | Roche et al. | ............ 156/345.24 |
| 6,967,109 B2 * | 11/2005 | Usui et al. | ....................... 438/6 |
| 2002/0180449 A1 | 12/2002 | Ushiku et al. | |
| 2004/0044419 A1 * | 3/2004 | Saki et al. | ........................ 700/2 |

FOREIGN PATENT DOCUMENTS

CN         1379437 A        11/2002

(Continued)

OTHER PUBLICATIONS

Notice of Grounds for Rejection mailed Oct. 4, 2005, issued by the Japanese Patent Office in counterpart Jaapanese Application No. 2004-189971 and English translation thereof.
Office Action issued by the Chinese Patent Office dated Jul. 28, 2006, in Chinese Patent Application No. 2004100746155.
Second Notification of Reasons for Refusal Issued by the Chinese Patent Office on Nov. 16, 2007, for Chinese Patent Application No. 200410074615.5., and English-language translation thereof.

(Continued)

*Primary Examiner*—Ryan A Jarrett
(74) *Attorney, Agent, or Firm*—Finnegan, Henderson, Farabow, Garrett & Dunner, L.L.P.

(57) ABSTRACT

The present invention provides a solution for interleaving data frames, in a semiconductor device manufacturing system in which the processing apparatus for conducting a process on any one of a semiconductor substrate and a thin film on a surface thereof; a self-diagnostic system for diagnosing a state of the processing apparatus; and a parameter fitting apparatus for maintaining a parameter of the self-diagnostic system when an inspection result of the semiconductor substrate having undergone the process has been determined to be correct, and for changing the parameter of the self-diagnostic system when the inspection result has been determined to be incorrect.

17 Claims, 12 Drawing Sheets

FOREIGN PATENT DOCUMENTS

| | | |
|---|---|---|
| JP | H04-69916 | 3/1992 |
| JP | H04-232741 | 8/1992 |
| JP | S63-272450 | 11/1998 |
| JP | 2000-091177 | 3/2000 |
| JP | 2002-129364 | 5/2002 |
| JP | 2002-515650 | 5/2002 |
| JP | 2002-299336 | 10/2002 |
| JP | 2003-77782 | 3/2003 |
| JP | 2004-266098 | 9/2004 |
| WO | WO96/25760 | 8/1996 |

OTHER PUBLICATIONS

Notification of Reasons for Refusal mailed on Nov. 17, 2009, by the Japanese Patent Office in copending Application No. 2005-351128 and English language translation thereof.

* cited by examiner

US 7,702,413 B2

SEMICONDUCTOR DEVICE MANUFACTURING SYSTEM AND METHOD FOR MANUFACTURING SEMICONDUCTOR DEVICES INCLUDING CALCULATING OXIDE FILM THICKNESS USING REAL TIME SIMULATOR

CROSS-REFERENCE TO RELATED APPLICATIONS

This application is based upon and claims the benefit of priority from the prior Japanese Patent Applications No. 2003-355684 filed on Sep. 8, 2003, and the prior Japanese Patent Applications No. 2004-189971 filed on Jun. 28, 2004; the entire contents of which are incorporated herein by reference.

BACKGROUND OF THE INVENTION

1. Field of the Invention

The present invention relates to a semiconductor device manufacturing system and a method for manufacturing a semiconductor device. In particular, the present invention relates to methods for controlling manufacturing apparatuses, a method for simulating a semiconductor device manufacturing process in which the foregoing methods are used, and a simulation apparatus.

2. Description of the Related Art

Heretofore, using semiconductor device manufacturing apparatuses, semiconductor devices including DRAMs have been manufactured by repeating substrate step formation, well formation, isolation, transistor formation, bit line formation, capacitor formation, and wiring formation. Such a semiconductor manufacturing process has been constituted by appropriately combining a lithography process, an etching process, heat treatment (oxidation, anneal, diffusion), an ion implantation process, a thin film formation process (CVD, sputtering, deposition), a cleaning process (resist removal, cleaning with solvent), a testing process, and the like.

In general, substrates are carried in and out of processing rooms while the atmospheres of various processing rooms are maintained and controlled, thus conducting processing in the room. In a Know system, measurement testing data obtained by inspecting an in-process or processed substrate is transferred to a central control system, in which the histories of substrates and processing rooms are managed and recorded, and in which self-diagnosis of each processing room and manufacturing apparatus is performed to output appropriate instructions for the manufacturing process written in International Laid open WO96/25760 (from page 36, line 25 to page 37, line 2).

FIG. 8 is a schematic block diagram of a known semiconductor device manufacturing apparatus 1. The semiconductor device manufacturing apparatus 1 has an oxidation heat element 4 for conducting a hot process, an oxidation heat element controller 2 for controlling this oxidation heat element 4, and an oxide film thickness controller 3 which is connected to the oxidation heat element 4 and the oxidation heat element controller 2 and which performs process control.

This oxide film thickness controller 3 has an oxide film thickness calculation section 6 for calculating an oxide film thickness, and a calculated film thickness judgment section 7 judging or determining a calculated film thickness. When a predetermined semiconductor manufacturing process utilizing a thermochemical reaction is performed, the oxide film thickness controller 3 initiates the semiconductor manufacturing process based on process execution initial settings previously set, measures and analyzes the state of the atmosphere of a predetermined system in which the thermochemical reaction is proceeding and the change in the atmosphere at predetermined time intervals, and transmits this analysis result back to the semiconductor manufacturing process written, in Japanese Patent Laid open No. 2002-299336 (column 11, lines 5 to 48, FIG. 1).

SUMMARY OF THE INVENTION

A semiconductor device manufacturing system according to an embodiment of the present invention includes a processing apparatus for conducting a process on a semiconductor substrate; a process control apparatus controlling operation of the processing apparatus and; a real time simulator monitoring a state of during apparatus at process processing of the semiconductor substrate The process includes, integrating a internal information of the processing apparatus, executing a simulation of a semiconductor manufacturing process, and estimating a progress of the semiconductor substrate by the process.

A semiconductor device according to a manufacturing system of an embodiment of the present invention includes a processing apparatus conducting a process using a semiconductor substrate; a self-diagnostic system which receives apparatus information from the processing apparatus and calculates the estimated quality of the processing; an inspection equipment for inspecting the semiconductor substrate having undergone the process; and a computer for comparing the inspected result with the estimated quality, and maintaining a parameter of the self-diagnostic system when the estimated quality is effective judgment, and changing the parameter of the self-diagnostic system when the estimated quality is substandard.

A method for manufacturing a semiconductor device according to an embodiments of the present invention includes conducting a process on a semiconductor substrate by a processing apparatus; monitoring a state of the processing apparatus during processing of the semiconductor substrate, integrating internal information of the processing apparatus, executing a simulation of a semiconductor manufacturing process, and estimating a progress of the semiconductor substrate by the process.

DETAILED DESCRIPTION OF THE INVENTION

Figure 1:
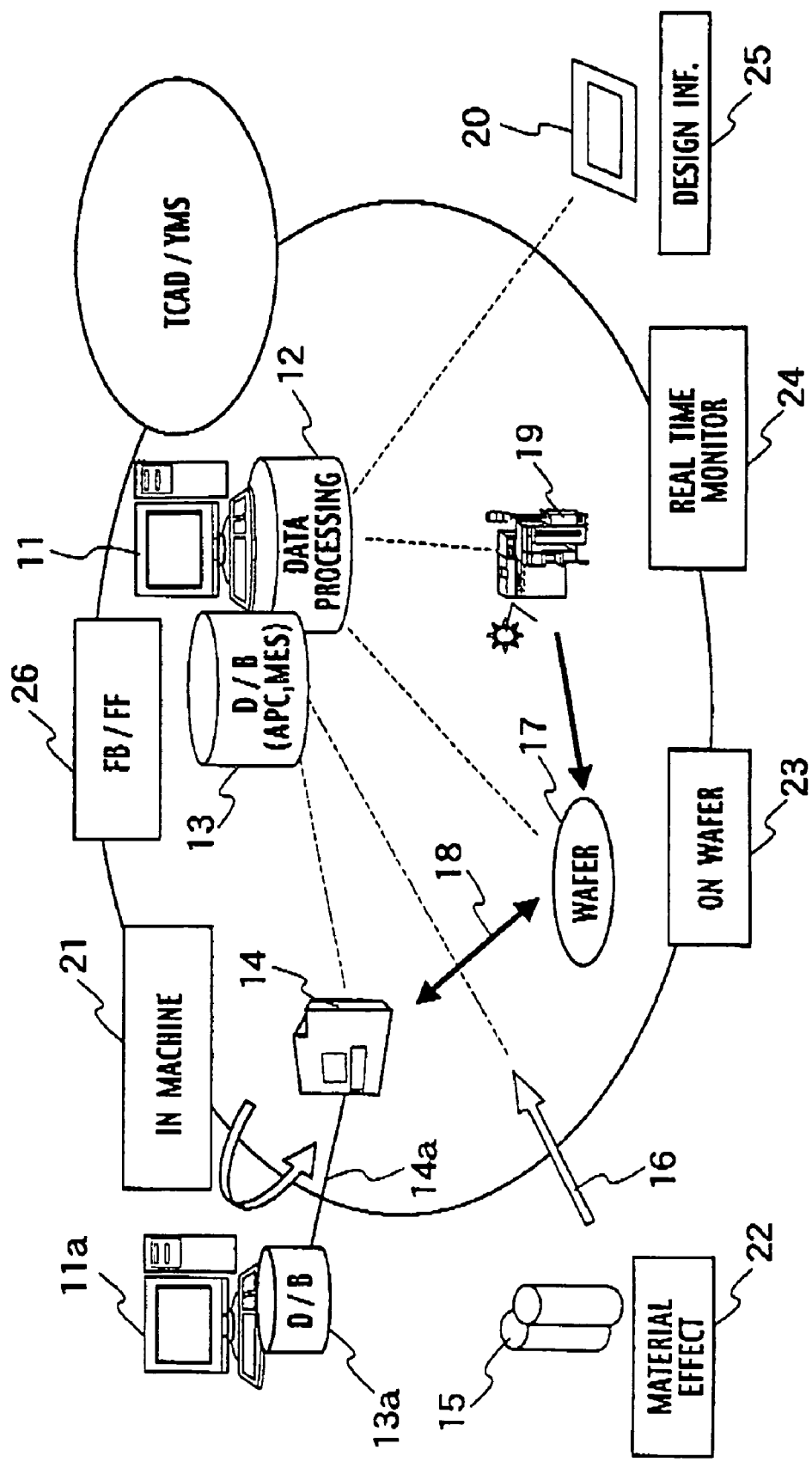
FIG. 1 is a schematic system diagram of a semiconductor device manufacturing system according to first and second embodiments of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

As shown in FIG. 1, a semiconductor device manufacturing system according to first and second embodiments of the present invention includes a processing apparatus 14 for conducting a process on a wafer 17 of a semiconductor substrate or a thin film on the surface thereof, a computer 11a as a self-diagnostic system for self-managing the processing apparatus 14 by use of an equipment engineering system (EES), and a computer 11 as a parameter fitting apparatus.

The computer 11 determines whether or not the processing apparatus 14 is automatically corrected based on an inspection result of the wafer 17 after it a processed semiconductor substrate, by inspection equipment 19, maintains (or fine-tunes) parameters of the self-diagnostic system when the judgment or determination result of the inspection is an effective determination (i.e. a correct result), and changes (e.g., increases the number of inspection times) parameters of the self-diagnostic system when the judgment or determination result is an ineffective determination (i.e. an incorrect result).

The semiconductor device manufacturing system is capable of adjusting inspection frequency during a semiconductor manufacturing process.

Here, the term "EES" is acquired equipment information from the process apparatus 14. The EES analyzes statistically the data of equipment information, and judges whether the system operation of process apparatus 14 is normal or unusual.

EES is conducted on the computer 11a as a self-diagnostic equipment system, and acquired of the internal state of process apparatus agreed 14 which is processing wafer 17 on real time.

A self-diagnostic equipment system (computer 11) is also acquirable of the wafer 17 real time currently processed inside since the internal state of process apparatus 14, due to self-diagnostic equipment system can be presumed the inside process state of process apparatus 14.

Computer 11a, as a self-diagnostic system may store a change in the process with respect to time that is carried out by the process apparatus 14 to database 13a, which corresponds to wafer 17.

Here, the term "APC" means the system which changes a semiconductor manufacture process on processing wafer 17 based on the results of processing of wafer 17. APC represents the process conditions of process apparatus 14 may be changed into new process conditions, referring to the past process conditions, when an inspected wafer 17 does not satisfy the expected quality, as a result of inspection by inspection equipment 19. The term "MES" refers to a semiconductor device production control system with computer 11, when a plurality of wafers 17 of a wafer lot are processed by process apparatus 14. MES conveys wafers 17 in one of selected lot to processing apparatus 14 so as to be undertaken predetermined processing by process apparatus 14. Further, MES means a system configured to control inspection equipment 19 so as to perform inspection of semiconductor device.

That is, the semiconductor device manufacturing system 10 includes the computer 11 for controlling the entire manufacturing system, a storage device 12 which is connected to the computer 11 and which stores a data processing algorithm related to a semiconductor manufacturing process, a database 13 which is connected to the computer 11 and which stores data for controlling an advanced process control (hereinafter simply abbreviated as "APC") system and a manufacturing execution system (hereinafter simply abbreviated as "MES"), the processing apparatus 14 for processing a wafer 17 as a semiconductor substrate, and the inspection equipment 19 for inspecting the wafer 17 processed by the processing apparatus 14.

The processing apparatus 14 shown in the drawing is illustrated as a single processing apparatus for simplification. However, as easily understood from a current LSI manufacturing process, a plurality of processing apparatuses 14, for example more than ten, are generally provided in the semiconductor device manufacturing system 10. The plurality of processing apparatuses 14 are respectively connected to computers 11a through signal lines 14a.

The computers 11a execute self-management for the equipment engineering system (EES). The plurality of processing apparatuses 14 are connected to the computer 11, directly or through the computers 11a, and can transmit apparatus information of the processing apparatuses 14 to the computers 11 and 11a. The computer 11 can integrally manage the entire system by executing the APC and the MES based on the received apparatus information.

Further, the processing apparatuses 14 can be various kinds of processing apparatuses for processing semiconductor devices. As a matter of course, for example, the processing apparatuses 14 include the following which can be applied to various semiconductor manufacturing processes: a film formation processing apparatus for conducting a film formation process; an impurity diffusion processing apparatus; a CVD thin film deposition apparatus; a heating heat element apparatus for reflowing (melting) a PSG film, a BSG film, a BPSG film (insulating film), or the like; a thermochemical reaction processing apparatus for adjusting the amount of densification in a CVD oxide film or the like, the thickness of a silicide film (electrode), and the like; a sputtering apparatus and a vacuum vapor deposition apparatus for depositing a metal wiring layer; a plating apparatus for plating; a CMP apparatus for chemically and mechanically polishing a semiconductor substrate; a dry or wet etching apparatus for etching the surface of a semiconductor substrate; a spin coating apparatus related to a photolithography process; an exposure processing apparatus such as a stepper; a wire bonding apparatus for bonding electrodes of a semiconductor device diced into a chip with a lead frame; and the like.

The semiconductor device manufacturing system 10 of the present invention can be applied to both of a batch processing apparatus and a single wafer processing apparatus. Similarly, all examples to be described later may also be applied to both of a batch processing apparatus and a single wafer processing apparatus.

The computer 11a stores manufacturing process data in an internal database 13a. While sequentially updating the lot number of a wafer 17 and the process history of the wafer 17 and providing the best process state at the present time (real time) to the processing apparatus 14, the computer 11a can perform a detection process 21 as to what is taking place inside the processing apparatus 14 and can transmit the internal state of the apparatus back to the semiconductor manufacturing process control.

For example, in the case where the processing apparatus 14 is a chamber for a vacuum-based processing apparatus, such as a film formation processing apparatus, a diffusion processing apparatus, or a thin film deposition apparatus, various parameters for determining conditions including the temperatures at a plurality of locations within a heat element, a susceptor temperature, the temperatures at a plurality of locations on the outer wall of the chamber, the pressure indicating the degree of vacuum in the chamber, the flow rate of gas, the degree of valve opening for controlling the gas flow rate, and the like, are arranged in processing order, thus executing the semiconductor manufacturing process.

In the case where the processing apparatus 14 is a plasma-based processing apparatus, such as a dry etching apparatus or an ion implantation apparatus, which is provided with electrodes, in addition to the above-described various processing parameters for a vacuum-based processing apparatus, various processing parameters including an RF matching point, RF voltages (progressive wave voltage, reflected wave voltage), wafer position information, and the like, are arranged in processing order, thus executing the semiconductor manufacturing process.

Furthermore, in the case where the processing apparatus 14 is an atmospheric pressure-based processing apparatus, such as a wet etching apparatus, a spin coating apparatus, a stepper exposure apparatus, or a wire bonding apparatus, various processing parameters including a processing time, wafer or chip position information of a wafer or a chip, and the like, are arranged in processing order, thus executing the semiconductor manufacturing process.

In the semiconductor device manufacturing system 10, in the case where the processing apparatus 14 uses a material gas and a liquid material as in the case of a film formation processing apparatus, a diffusion processing apparatus, or a thin film deposition apparatus, the a material gas and a liquid material is supplied through a gate 16, and self process management is performed by recording, in the database 13, data in which material evaluation is performed on direct and indirect materials 15 including a direct material, such as a material gas and a liquid material to be supplied to the apparatus, and an indirect material, such as a container. This material modeling makes it possible to perform, in real time, a judgment or determination process 22 as to whether or not a material, such as a material gas and a liquid material, influences the semiconductor manufacturing process.

The wafer 17 has a load and unload linkage 18 with the processing apparatus 14, and process result phenomenon judgment section 23 on the wafer 17 is inspected by the sensor/inspection equipment 19 based on the presence or absence of a defect in a film thickness and a pattern defect every time the wafer 17 passes through a predetermined processing step. This inspection result becomes key information for managing wafers 17 in lots or in single wafers, and is supplied to a judgment process 24 of real time monitoring/Quality control QC by collecting the information through the computer 11.

The computer 11 obtains quality information, apparatus information, and direct and indirect material information from the inspection equipment 19 and the processing apparatus 14 or the computer 11a, and processes the foregoing information as parameter information of the APC and the MES stored in the database 13. Thus, the computer 11 can sufficiently know the state of the processing apparatus 14 and the quality of a semiconductor device by simulating, in real time, what quality (e.g., film thickness) a wafer 17 of a lot carried out of the processing apparatus 14 has, even if testing in an intermediate processing step is omitted.

The computer 11 can transmit the quality information back to the semiconductor manufacturing process or forward the information to other processing apparatuses (not shown) for subsequent steps. The accuracy of estimated quality information can be improved by comparing quality information transmitted from the inspection equipment 19 every time a plurality of lots are processed and estimated quality information transmitted from the processing apparatus 14 and by simulating the semiconductor manufacturing process on the computer 11.

The computer 11 manages design information 25 of a mask 20 (reticle) used in lithography process. In the case where a specified defect position has been detected on a wafer in the judgment process 24 of real time monitoring/QC, the computer 11 can perform a judgment process as to whether or not the mask 20 has an incorrect design.

As described above, the semiconductor device manufacturing system 10 according to the embodiment of the present invention constitutes an integrated APC system using the computer 11 by modeling the processing apparatus 14, the direct and indirect materials 15, and the process for a wafer 17. Accordingly, the semiconductor device manufacturing system 10 has the following advantages: real time quality control can be executed, application to a technology CAD (TCAD) and a yield management system (YMS) can be expected, and the final yield of semiconductor devices can be estimated even in an intermediate processing step before the final step is completed. Using first to eighth embodiment, features of the semiconductor device manufacturing system 10 according to the embodiment of the present invention will be described below.

Figure 2:
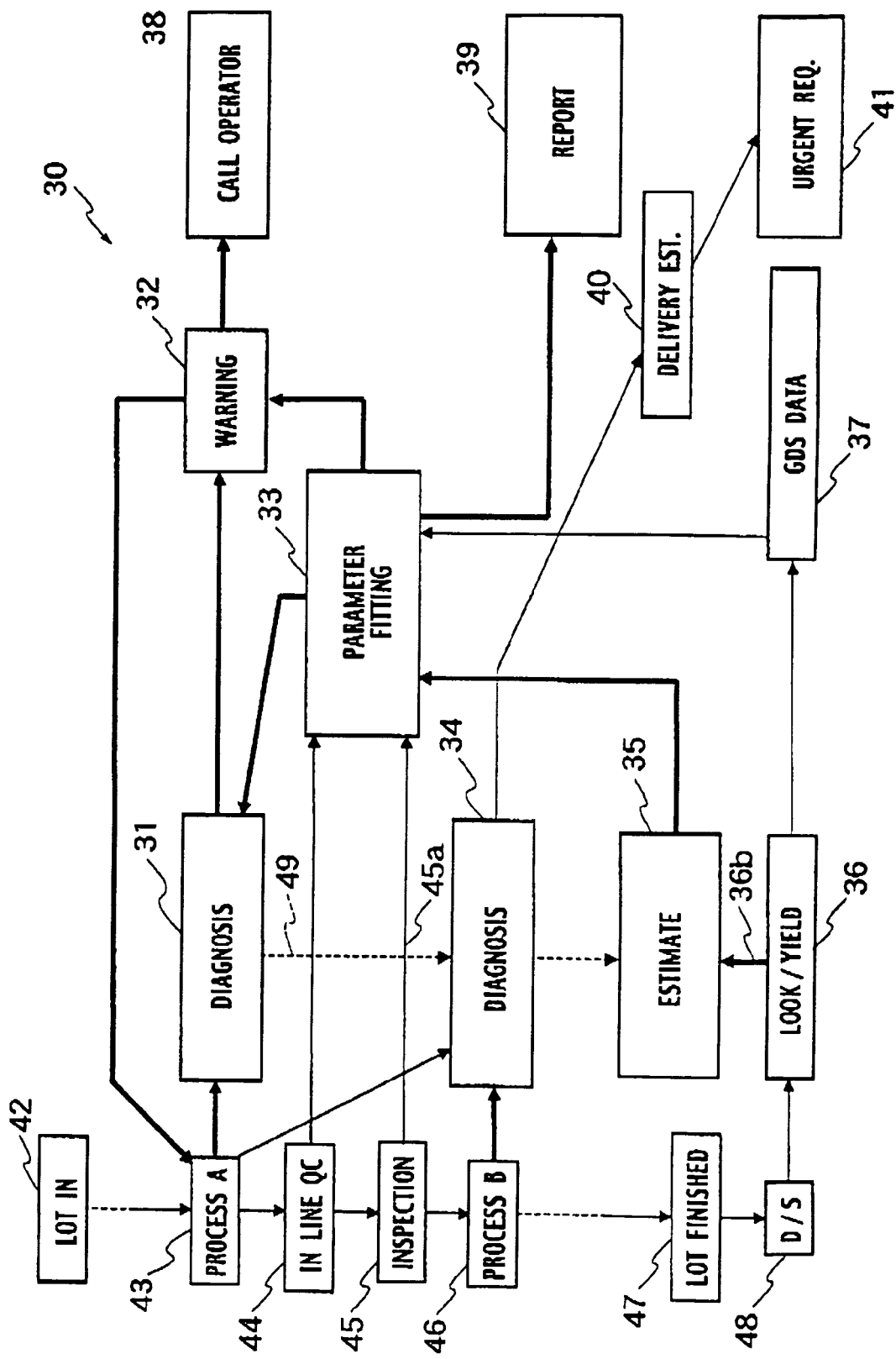
FIG. 2 is a schematic flowchart for explaining a method for manufacturing a semiconductor device according to a first and second embodiment.

FIG. 2 is a schematic flowchart for explaining a method for manufacturing a semiconductor device of a first and second embodiment of the present invention. A semiconductor device manufacturing system 30 moves sequentially through a plurality of processing steps and inspection steps, which include a wafer lot inputting step 42, a first processing step 43 in which processing A by a processing apparatus is performed on the surface of wafers, such as semiconductor substrates or thin films, a first inspection step 44 in which an in-line QC process by a first inspection equipment is performed, a second inspection step 45 in which defect inspection of a surface pattern by, a second inspection equipment is performed, a second processing step 46 in which processing B by a processing apparatus is performed on the wafers or thin films on the surfaces of the substrates third and fourth processing steps and a third inspection step (not shown), and the like, Then the lot reaches a lot completion step 47 in which processing of the lot is completed. The yield of a plurality of semiconductor devices formed in the wafers in the lot completion step 47 is inspected by a yield inspection equipment in a die sorting (D/S) step 48 (hereinafter simply abbreviated as "D/S step").

A probe testing of electrical characteristics of chips is performed in the D/S step, and the chips are divided into non-defective products and defective products. The defective chips are marked with ink so as to be identified.

In the first processing step 43, wafers are carried into the processing apparatus by the lot inputting step 42, and processing A is performed in accordance with a semiconductor manufacturing process sequence previously set. Various processes including a deposition process, an oxidation process, a plasma process, a wet process, a CMP process, a bonding process, and the like, can be conducted as processing A.

For example, in the case where the first processing step 43 in which processing A is performed is a deposition process, apparatus information 43a including the gas pressure of the processing apparatus, temperature, RF voltages, the presence or absence of a spark, the amount of deposited material, and the like is transmitted to a self-diagnostic system 31 while a series of deposition processes of gas injection, temperature management, pressure management, RF voltage management, and gas emission are being performed on the wafers.

In the case where the first processing step 43 is a CMP process, a wafer polishing process is performed while the amount of a polishing agent, the rotational speed of a polishing table, and the deterioration condition of the polishing table are being monitored, and apparatus information 43a including the supply of the polishing agent to the processing apparatus, the replacement timing of the polishing table, and the like is transmitted to the self-diagnostic system 31.

The self-diagnostic system 31 may include a plurality of pressure sensors, temperature sensors, spark sensors, deposited-film thickness sensors, or the like arranged in the processing apparatus so as to inspect all wafers in real time. The self-diagnostic system 31 should be configured by providing a plurality of sensors corresponding to the semiconductor manufacturing process so as to receive signals indicating the state of the processing apparatus.

Event information 43b, such as maintenance timing, cleaning timing, component replacement timing of the processing apparatus used in the first processing step 43 is transmitted to a self-diagnostic system 34 of the second processing step 46 in which processing B is performed. Based on this event information 43b, the state (or characteristics) the current (real time) in-process lot of the first processing step 43 has when transferred to the second processing step 46, can be estimated.

The self-diagnostic system 31 measures and analyzes the amount of material which is accumulated, deposited, or consumed in the processing apparatus 14 shown in FIG. 1 due to the progress of the semiconductor manufacturing process at predetermined time intervals (e.g., intervals of one second), and generates an automatic-correction request signal at the stage at which the amount of this material reaches a predetermined amount. The automatic-correction request signal is transmitted as QC information 31a to a warning device 32. In the initial phase of operation of the semiconductor device manufacturing system 30, in response to the automatic-correction request signal contained in the QC information 31a, the warning device 32 transmits automatic-correction timing instruction information 32a to the processing apparatus 14, such as an oxidation heat element, which operates in the first processing step 43.

Taking as an example the case where a thermo chemical reaction process is performed in the first processing step 43 in which processing A is performed, the amount of oxide which is deposited inside an oxidation heat element is measured and analyzed at predetermined time intervals (e.g., intervals of one second), and an automatic-correction request signal is generated at the stage at which the amount of the deposited oxide reaches a predetermined deposited amount (an amount which interferes with the thermo chemical oxidation of the wafers). This automatic-correction request signal is transmitted as QC information 31a to the warning device 32. In the initial phase of operation of the semiconductor device manufacturing system 30, in response to the automatic-correction request signal in the QC information 31a, the warning device 32 may transmit automatic-correction timing instruction information 32a to the oxidation heat element.

In the oxidation heat element as an example, at the stage at which the automatic-correction timing instruction information 32a has been received but the first processing step 43 is being performed, an automatic correction process should be delayed until a semiconductor manufacturing process of one unit is finished. Cleaning gas should be introduced into the oxidation heat element after lot processing of the current in-process wafers has been completed and the wafers have been removed from the oxidation heat element.

In this case, an in-line QC process is subsequently performed on the removed wafers in the first inspection step 44, and QC information 44a including thickness information of films formed on the wafers is transmitted to a parameter fitting apparatus 33.

The wafers for which the in-line QC process has been completed in the first inspection step 44 are inspected for pattern defects by use of the second inspection equipment in the second inspection step 45, and QC information 46a containing the result of the defect inspection is transmitted to the parameter fitting apparatus 33. In this "in-line QC," the measurement parameter in the thickness direction, such as the measurement of the film thickness of a thin film, is mainly performed. Further, the "defect inspection" is mainly intended for the inspection of defects on planar patterns formed by a photolithography process.

The parameter fitting apparatus 33 fits parameters to a model of the aforementioned self-diagnostic system 31 and process parameters of the model. Fitting in the present embodiment means the function of changing or reconstructing (e.g., generating an automatic-correction request signal only after processing apparatus malfunction signals have been continuously received for three lots), into an appropriate timing, i.e., the timing with which an automatic-correction request signal is generated based on the apparatus information 43a which the self-diagnostic system 31 receives from the processing apparatus at the predetermined time intervals.

In the case where the model and parameters of the self-diagnostic system 31 are not appropriate, even if a malfunction parameter indicating that a malfunction has occurred in an oxidation process of the processing apparatus is included in the apparatus information 48a, the current in-process lot finishes the processing to be carried out by the processing apparatus, and the inspection result in the first inspection step 44 falls within the range of normal values. The processing is continued if the inspection result in the second inspection step 45 also falls within the range of normal values. Accordingly, it can be determined that the malfunction parameter itself in the apparatus information 43a transmitted from the processing apparatus is an error.

In the present embodiment, in order to improve the accuracy of apparatus information 43a containing an errorless malfunction parameter, the quality of the wafer lot is inspected when the malfunction parameter has been transmitted. Then, whether or not the apparatus information 43a and the state of the wafers match each other is statistically determined, and a modified parameter 33a is transmitted back from the parameter fitting apparatus 33 to the self-diagnostic system 31.

Typically, computer 11 can be control so that the QC information 44a and the QC information 45a of the wafers of the previous ten lots are obtained through the first inspection step 44 and the second inspection step 45 and that parameters 33a of the model of the self-diagnostic system 31 are sequentially changed while the QC information 44a and the QC information 45a are being compared to a malfunction parameter of the apparatus information 43a.

Taking as an example a semiconductor device manufacturing system in which a deposition processing apparatus is used, computer 11 can also be control for implementing the following: a film thickness testing is performed by use of a film thickness inspection equipment in the first inspection step 44, a defect inspection is performed by use of a pattern defect inspection equipment in the second inspection step 45, some inspection data from respective pieces of inspection result information are obtained by network-line, the some inspection data from respective pieces of inspection result information are compared to a malfunction parameter of the apparatus information 43a, and parameters 33a of the model of the self-diagnostic system 31 are sequentially changed.

The self-diagnostic system 31 executes the self-diagnosis of the processing apparatus while modifying parameters of the model of the self-diagnostic system 31 during the period in which the semiconductor device manufacturing system 30 is operating. That is, the self-diagnostic system 31 monitors the state of the processing apparatus and generates highly accurate QC information 31a in response to the reception of a malfunction signal. This QC information 31a is a signal for prompting the warning device 32, which issues a warning to a manufacturing execution system (MES), to transmit an automatic-correction timing instruction information 32a.

In response to the reception of the QC information 31a, the warning device 32 transmits, to the processing apparatus, warning information of the automatic-correction timing instruction information 32a for instructing the processing apparatus to perform maintenance. In this case, as the frequency of maintenance increases, the availability of the semiconductor device manufacturing system 30 decreases. Accordingly, as a matter of course, the accuracy of the automatic-correction timing instruction information 32a particularly influences quality control and mass production efficiency.

For example, in the case where the processing apparatus 14 shown in FIG. 1 is a deposition processing apparatus, the deterioration in quality is prevented by optimizing the number of times cleaning gas is introduced the heat element. Thus, by reducing the number of cleaning operations, the production volume of semiconductor devices can be increased.

In response to the receipt of the QC information 31a, the warning device 32 transmits maintenance information 32b to notify an operator of the occurrence of automatic correction. For example, it is possible to adopt visual notification by an alarm placed in the vicinity of the processing apparatus, or a maintenance instruction screen 38 can be displayed on a monitor for an operator monitoring the entire semiconductor manufacturing process.

Further, in response to inspection frequency modification instruction information 33b received through another route, the warning device 32 can control the number of times the aforementioned first and second inspection steps 44 and 45 occur, so as to adjust the frequency of wafer lot inspection. That is, at the stage at which the quality of the semiconductor manufacturing process is, stabilized along a learning curve and the necessity of a real time/total inspection is decreased, the semiconductor manufacturing process can be automatically reconstructed so that quality inspection in the first and second inspection steps 44 and 45 are omitted, in response to the inspection frequency modification instruction information 33b from the parameter fitting apparatus 33, and the throughput of wafers as semiconductor devices can be increased by reducing the number of inspection steps.

Furthermore, the parameter fitting apparatus 33 generates report information 33c of new defect detection occurring in a predetermined lot, and can report, in real time, the fact that a new defect of a wafer existing in an intermediate step has been detected, to a defect detection report section 39.

On the other hand, a finished quality/yield collection section 36 obtains yield information 48a by inspecting, in the D/S step 48, wafers from the lot completion step 47. For example, in the case where the yield has been determined to be reduced, the finished quality/yield collection section 36 transmits yield information 36b indicating the reduction of yield to a finished quality/yield estimation system 35 so that a quality control system is automatically enhanced in real time.

The finished quality/yield estimation system 35 conducts quality control of wafers in real time, and estimates the trend (increase or decrease) of yield while comparing prior yield information and the current yield information 36b. The finished quality/yield estimation system 35 can control the parameter fitting apparatus 33 to transmit inspection frequency modification instruction information 33b to the warning device 32 by transmitting yield estimation information 35a indicating the trend of yield to the parameter fitting apparatus 33.

The above-described inspection frequency modification instruction information 33b is automatically adjusted. An example of a controlling method thereof will be described. Typically, inspection frequency can be automatically adjusted using the process capability index Cp of the processing apparatus that operates in the first processing step 43. Here, the thickness of a film formed on a wafer, the diffusion depth of impurities, or an etching rate is set as a target value, and each variable is defined. The process capability index Cp of the processing apparatus is calculated by accumulating the upper limit standard Su in the processing apparatus. The upper limit standard is obtained by adding a predetermined value to the target value. The lower limit standard Sl in the processing apparatus is obtained by subtracting a predetermined value from the target value. The average x in the processing apparatus is obtained by averaging actually-measured values of several processed lots, and the standard deviation $\delta$ in the processing apparatus indicates the deviation of each actually-measured value from the average x. The relationship $Cp=(Su-x)/3\delta$ is established based on the upper limit standard Su, and the relationship $Cp=(x-Sl)/3\delta$ is established based on the lower limit standard Sl.

When the above-described, process capability index Cp is, for example, less than 1.33 (Cp<1.33), the semiconductor manufacturing process is reconstructed so that the inspection frequency is increased. When the process capability index Cp is, for example, equal to or more than 1.33 and less than 1.67 ($1.33 \leq Cp<1.67$), a control is performed so that the inspection frequency is maintained without changed. Furthermore, in the state where the process capability index Cp is, for example, equal to or more than 1.67 ($1.67 \leq Cp$), automatic control should be performed to reconstruct the semiconductor manufacturing process so that the inspection frequency is reduced.

The process capability index of the processing apparatus may be calculated from the inspection result of film thicknesses, the diffusion depths of impurities, etching rates, or the like for the previous ten lots removed from the processing apparatus, based on the inspection average x in the processing apparatus and the upper limit standard Su in the processing apparatus or the lower limit standard Sl in the processing apparatus. In this case, even when the inspection frequency is changed to twice, once, or 0.5 times the current inspection frequency in accordance with the process capability Cp, semiconductor manufacturing process control equivalent to the aforementioned inspection frequency control can be performed.

Taking as an example an oxidation heat element as the processing apparatus, when the film thickness defined as a target value is set to 10 nm, inspection frequency can be controlled by setting the upper limit standard Su and the lower limit standard Sl respectively to 12 nm and 8 nm, respectively.

Furthermore, the finished quality/yield collection section 36 transmits yield information 36a to a good die sorting (hereinafter simply abbreviated as "GDS") data extraction request section 37, and can prompt the GDS data extraction request section 37 to transmit mask information 37a obtained by extracting part of the mask data used in a photolithography process to the aforementioned parameter fitting apparatus 33. For example, in the case where defective portions on a wafer, which adversely affects the yield of semiconductor devices, are locally distributed. The parameter fitting apparatus 33 may be advantageously exerted the feedback effect to the process model of the self-diagnostic system 31.

Second Embodiment

The flow of the operation of a semiconductor device manufacturing system 30 of a second embodiment of the present invention will be described with reference to FIG. 2. Note that the same components and steps as those of the above-described first embodiment will not be further described.

The semiconductor device manufacturing system 30 includes a first processing step 43 in which wafers carried from a lot inputting step 42 are processed, a first inspection step 44 in which the wafers processed in the first processing step 43 are inspected, a second inspection step 45 in which the wafers having undergone the first inspection step 44 are inspected, a second processing step 46 in which the wafers having undergone the second inspection step are processed, a lot completion step 47 in which semiconductor devices are completed in the wafers having undergone a plurality of processing and inspection steps, and a D/S step 48 in which the wafers are inspected.

The semiconductor device manufacturing system 30 further includes a self-diagnostic system 31 for conducting self-diagnosis on the first processing step 43, a self-diagnostic system 34 for conducting self-diagnosis on the second processing step 46, a finished quality/yield collection section 36 for receiving yield information 48a obtained in the D/S step 48, and a finished quality/yield estimation system 35 which is connected to the finished quality/yield collection section 36 and which estimates the finished quality/yield of semiconductor devices.

The semiconductor device manufacturing system 30 is configured so as to inspect wafers having passed through the aforementioned lot completion step 47 in the D/S step 48, to transmit yield information 48a to the finished quality/yield collection section 36, to generate new yield information 36b, and to transmit the new yield information 36b to the finished quality/yield estimation system 35.

The semiconductor device manufacturing system 30 estimates the yield of semiconductor devices in wafers for each lot by showing the state of a semiconductor manufacturing process of an upstream part of the semiconductor manufacturing process. That is, the state of a processing apparatus operating in the first processing step 43 can be, in real time, reflected in the semiconductor manufacturing process performed in the second processing step 46 by managing a several events such as maintenance timing at which consumables of the processing apparatus in the upstream step have been replaced, cleaning timing, and component replacement timing from the processing apparatus placed in an upstream step and by transferring event information 43b, to the self-diagnostic system 34 connected to a processing apparatus for conducting a process in the second processing step 46, which is a downstream step.

For example, the state of a deposition processing apparatus operating in the first processing step 43 can be, in real time, showed in the semiconductor manufacturing process. The deposition processing apparatus performed in the second processing step 46 that managing an event of the deposition processing apparatus placed in an upstream step and by transferring a several event information 43b, such as maintenance timing at which consumables of the deposition processing apparatus have been replaced, the cleaning timing of the deposition processing apparatus, and the component replacement timing of the deposition processing apparatus. The self-diagnostic system 34 connected to the etching apparatus for another semiconductor manufacturing process, which operates in the second processing step 46 as a downstream step.

Furthermore, the self-diagnostic system 31 in the upstream step is connected to the self-diagnostic system 34 in the downstream step, and transmits lot information 49 related to the quality control of wafers processed by the processing apparatus.

The self-diagnostic system 34 Synthetic numerically evaluates the aforementioned event information 43b and the aforementioned lot information 49, determines quality, i.e., whether a wafer lot to be processed in the second processing step 46 has passed through an upstream step in which the state of the processing apparatus is good or through an upstream step in which the state of the processing apparatus is deteriorated, based on the numerically evaluates value, and can perform highly accurate self-diagnostic process based on apparatus information 46a transmitted, in real time, from the processing apparatus for conducting processing B on the wafers in the second processing step 46.

The self-diagnostic system 34 calculates the yield (e.g., a yield of several tens of percent) of wafers having undergone the second processing step 46 by multiplying the event information 43b, the lot information 49, and the apparatus information 46a of the processing apparatus for conducting a process in the second processing step 46, and then transmits the calculation result to a delivery estimation section 40.

In this case, defective portions of the wafer, due to a malfunction process in the first processing step 43, cannot be corrected in the second processing step 46. Accordingly, since the wafer yield decreases as the wafer goes toward the downstream side of a semiconductor manufacturing process, the delivery estimation section 40 can estimate or determine, in an intermediate step of the semiconductor manufacturing process, the number of semiconductor devices which will ultimately become non-defective products.

The delivery estimation section 40 can automatically perform a wafer inputting quantity control to quickly process 41 on a production planning computer (not shown) for creating an operation plan of the semiconductor device manufacturing system 30. Since a Substitution lot can be inputted in a wafer process at an earlier stage than in the case where defectives are detected in the final wafer inspection, and profit increased for the semiconductor manufacturer business.

Third Embodiment

A semiconductor device manufacturing system 51 described in a third embodiment can be used for various kinds of processing apparatuses for processing semiconductor devices. As a matter of course, for example, the processing apparatuses 14 include the following processing apparatuses which can be applied to various semiconductor manufacturing processes: a film formation processing apparatus for conducting a film formation process; an impurity diffusion processing apparatus; a CVD thin film deposition apparatus; a heating heat element apparatus for reflowing (melting) a PSG film, a BSG film, a BPSG film (insulating film), or the like; a thermochemical reaction processing apparatus for adjusting the amount of densification in a CVD oxide film or the like, the thickness of a silicide film (electrode), and the like; a sputtering apparatus and a vacuum vapor deposition apparatus for depositing a metal wiring layer; a plating apparatus for plating; a CMP apparatus for chemically and mechanically polishing a semiconductor substrate; a dry or wet etching apparatus for etching the surface of a semiconductor substrate; a spin coating apparatus related to a photolithography process; an exposure processing apparatus such as a stepper, a wire bonding apparatus for bonding electrodes of a semiconductor device diced into a chip to a lead frame; and the like.

Figure 3:
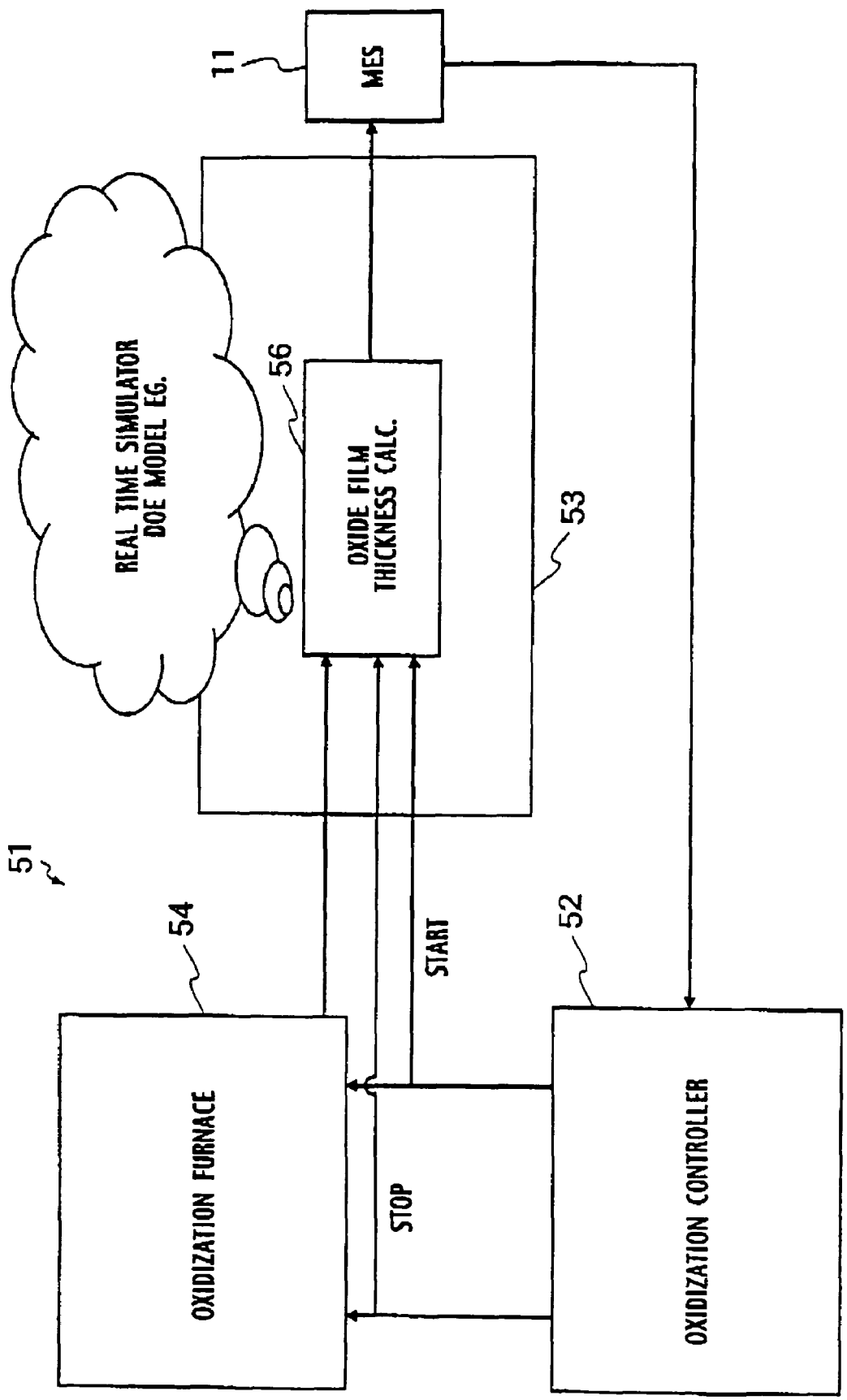
FIG. 3 is a schematic block diagram of a semiconductor device manufacturing apparatus according to a third embodiment.

FIG. 3 is a schematic block diagram of the semiconductor device manufacturing system 51 of the third embodiment of the present invention. The semiconductor device manufacturing system 51 includes, for example, an oxidation heat element 54 as a process conducting section in which a hot process using a thermochemical reaction is performed, an oxidation heat element controller 52 as a process control apparatus, a computer 11 for controlling the operation or non-operation of the oxidation heat element controller 52 and the state of the operation thereof, and an oxide film thickness real time simulator 53 which is placed between the computer 11 and the oxidation heat element 54 and which calculates the thickness of an oxide film on a wafer. The oxide film thickness real time simulator 53 is configured as an apparatus other than the oxide heat element controller 52 in the present embodiment, but may be integrally configured as part of the functions of the oxide heat element controller 52.

In the oxide film thickness real time simulator 53, in response to a start signal transmitted from the oxidation heat element controller 52 to the oxidation heat element 54, an internal oxide film thickness calculation section 56 initiates calculation of the thickness of an oxide film formed on a wafer carried in the oxidation heat element 54, based on apparatus internal information transmitted from the oxidation heat element 54 in real time and which indicates the temperature and pressure of the inside of the heat element. The calculated value of the oxide film thickness is transmitted to the computer 11 in real time, and used to control of the aforementioned MES.

Based on the control information of the MES stored on an internal database, the computer 11 transmits a control signal to the oxidation heat element controller 52 at the stage at which the calculated value of the oxide film thickness reaches a predetermined calculated value of the oxide film thickness. In response to the control signal, the oxide heat element controller 52 transmits a stop signal for stopping the oxidation process in the oxidation heat element 54. In parallel, this stop signal is monitored by the oxide film thickness calculation section 56 in the oxide film thickness real time simulator 53. Thus, it is possible, in real time, for the oxide film thickness real time simulator 53 to detect the timing with which the oxidation process has shifted to a stop.

In a known semiconductor device manufacturing apparatus, since an oxide film thickness calculation section does not monitor a stop signal for stopping an oxidation process, it is impossible to determine whether or not the current apparatus internal information indicates the heat element internal state after a stop signal has been transmitted. However, in the semiconductor device manufacturing system 51 of the present embodiment, shown in FIG. 3, since the oxide film thickness real time simulator 53 monitors a stop signal transmitted from the oxidation heat element controller 52, the oxide film thickness can be continuously calculated in real time based on the apparatus internal information indicating decreases in the internal temperature and pressure of the oxidation heat element 54 from the time of stopping the oxidation process.

Upon receiving a start signal transmitted from the oxidation heat element controller 52, based on the apparatus internal information, the oxide film thickness calculation section 56 initiates the calculation of the thickness of an oxide film formed on a wafer inside the oxidation beat element 54, receives a stop signal transmitted from the oxidation heat element controller 52 after a predetermined process period, and continues the calculation of the oxide film thickness in real time until a predetermined time elapses.

The calculated value of the oxide film thickness by the oxide film thickness calculation section 56 indicates an instantaneous value calculated every time the apparatus internal information is transmitted from the oxidation heat element 54. The instantaneous value is integrated over the period from the time of the arrival of a start signal, followed by the arrival of a stop signal for completing an oxidation process, to the time when a predetermined time elapses, in accordance with a design-of-experiment (DOE) for the semiconductor devices model 59 by experimental design, and the thickness of the entire oxide film formed on a wafer can be calculated.

The semiconductor device manufacturing system 51 using the oxide film thickness real time simulator 53 is different from a known manufacturing apparatus in the following point: chamber number information is added to EES data 60 to be processed by the computer 11 and, for example, in the case where the oxidation heat element 54 includes a plurality of chambers, different pieces of EES data 60 are respectively related to the plurality of chambers. This makes it possible to improve the accuracy of the calculation of the oxide film thickness. In addition, since apparatus internal information for each chamber is obtained in real time, the semiconductor device manufacturing system 51 has a technical advantage in an oxide film thickness real simulation for single-wafer processing.

In the present embodiment, the process time-varying elements of the oxidation heat element 54 are incorporated into the thermochemical reaction process in real time. Accordingly, for example, it is also possible to receive event information, such as maintenance timing with which consumables are replaced and the cleaning timing of the oxidation heat element 54, and to achieve integration of the event information with respect to the time elapsed analyze by use of the oxide film thickness real time simulator 53. Accordingly, precise quality control can also be performed compared to the case of a known semiconductor device manufacturing apparatus in which all lots are processed under the same semiconductor manufacturing process conditions.

Though the above description has been made on the assumption that the semiconductor device manufacturing system 51 is an oxidation processing apparatus, the present invention is not limited to an oxidation processing apparatus. For example, for a processing apparatus such as an etching apparatus, it is possible to configure a semiconductor device manufacturing system having a real time simulator function, such as "end point monitor+etch rate estimation" illustrated as a component of the real time simulator shown in FIG. 3.

Fourth Embodiment

Figure 4:
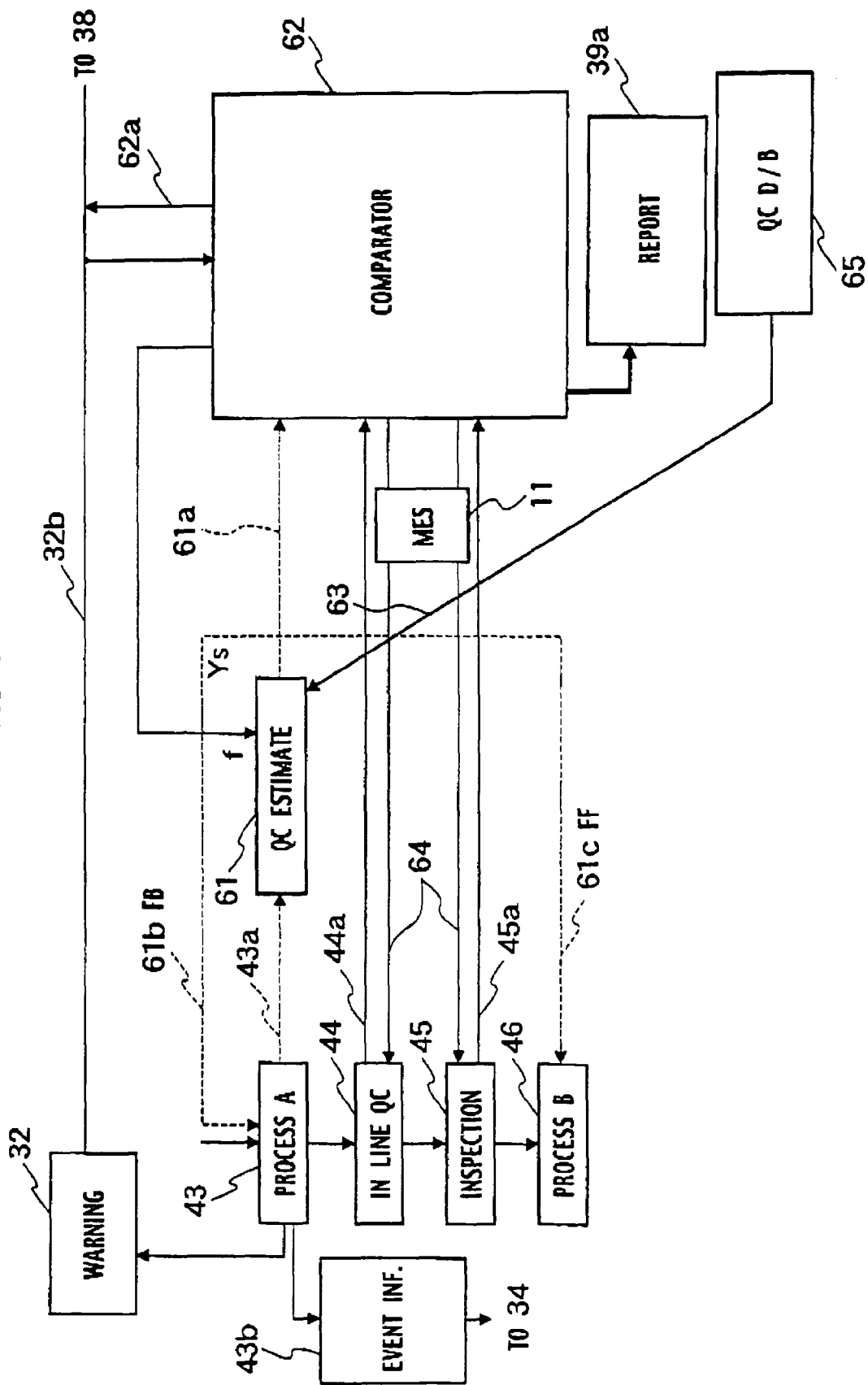
FIG. 4 is a schematic flowchart for explaining a method for manufacturing a semiconductor device according to a fourth embodiment.

FIG. 4 is a schematic flowchart for explaining a method for manufacturing a semiconductor device of a fourth embodiment of the present invention. A first processing step 43 in which processing A is performed, a first inspection step 44 in which in-line QC is performed, a second inspection step 45 in which defect inspection is performed, a second processing step 46 in which processing B is performed, a to-engineer defect detection report section 39a, QC information 44a and 45a, maintenance information 32b are the same as those of the aforementioned first embodiment and will not be further described.

The semiconductor device manufacturing system described in the present embodiment is configured so as to diagnose each processing apparatus, each sensor, and a model of a self-diagnostic system utilizing the difference between an estimated quality control value and an actually-measured value. A quality estimation section 61 receives apparatus information 43a (e.g., EES data) including a plurality of variables X from a processing apparatus conducting a process in the first processing step 43, calculates estimated quality data 61a containing a plurality of output Y data corresponding to the current lot in a thermochemical reaction process based on the model of the self-diagnostic system which is represented by a function f, parameters a and b of the model, and the plurality of variables X included in the apparatus information 43a received in real time, and transmits the estimated quality data 61a to a comparator 62 which functions as an anomaly detection apparatus.

The estimated quality data 61a contains the in-plane distribution of an oxide film thickness of a wafer, μ data of the average of the oxide film thickness, and a data of a standard deviation indicating the variation in oxide film thickness. Real time quality information of a semiconductor device can be provided to a computer 11 connected to the comparator 62 and which controls an MES.

The computer 11 is connected to an in-line QC processing apparatus for conducting the first inspection step 44 and a defect inspection equipment for conducting the second inspection step 45. Based on difference information obtained by comparing the estimated quality data 61a and each of the QC information 44a by the first inspection step 44 and the QC information 45a by the second inspection step 45, the computer 11 outputs optimization information 64 for the inspection frequency of the first inspection step 44 or the second inspection step 45 to the incline QC processing apparatus or the defect inspection equipment. Thus, it is possible to omit the first inspection step 44 or the second inspection step 45 and to shorten the period of the semiconductor device manufacturing process.

The quality estimation section 61 receives model-and-parameter information 63 of the self-diagnostic system based on Mahalanobis' distance which is stored as quality control data in, for example, a QC database 65, and calculates estimated quality data 61a by arithmetically processing the time-varying state of the interior of an oxidation heat element conducting a process in the first processing step 43. The estimated quality data 61a is transmitted to the comparator 62 as described above. In parallel, the estimated quality data 61a is transmitted as feedback information 61b to the oxidation heat element in the first processing step 43, and transmitted as feed forward information 61c to a processing apparatus, such as an etching apparatus or a photolithography processing apparatus, which performs a semiconductor manufacturing process and which performs processing B in the second processing step 46 located downstream of the first processing step 43.

The comparator 62 is configured so as to receive the estimated quality data 61a from the quality estimation section 61, the QC information, 44a from the inspection equipment for conducting the first inspection step 44, the QC information 45a from the inspection equipment for conducting the second inspection step 45, and the maintenance information 32b from a warning device 32.

As described above, the comparator 62 receives the estimated quality data 61a obtained by arithmetically processing the apparatus information 43a and the model-and-parameter information 63 from the quality estimation section 61, and can receive an actually measured value from each of the inspection equipments conducting processes in the first and second inspection steps 44 and 45. While comparing estimated values with actually measured values related to quality control, the comparator 62 can estimate parameters of the self-diagnostic system. That is, while approximating estimated parameters of the self-diagnostic system to actually measured values, the comparator 62 can transmit corrected parameters a and b of the self-diagnostic system to the quality estimation section 61.

Estimated quality data Ys output from the quality estimation section 61 is fed back to a semiconductor manufacturing process of the first processing step 43 to stabilize quality, and estimated quality Ys is fed forward to the second processing step 46, whereby parameters of the processing apparatus for conducting a process of the second processing step 46 are matched with the estimated quality Ys in advance. Thus, a process based on the estimated quality Ys can be performed at the stage at which the current lot of the first processing step 44 is carried in the second processing step 46.

Since the comparator 62 obtains the estimated quality data 61a and the QC information 44a and 45a as actually measured values as described previously, it is possible to determine, at an early stage, the state where highly accurate quality control cannot be performed because of the malfunction of any one or all of the processing apparatus of the first processing step 43, the inspection equipment of the first inspection step 44, and the inspection equipment of the second inspection step 45.

Upon detecting a signal indicating the occurrence of malfunction in the processing apparatus of the first processing step 43, the inspection equipment of the first inspection step 44, or the inspection equipment of the second inspection step 45 based on the estimated quality data 61a, the comparator 62 transmits an apparatus/sensor anomaly detection signal 62a to the warning device 32 and a monitor for an operator to stop the semiconductor manufacturing process. The current quality control information can be displayed on a maintenance instruction screen 38 for an operator.

Fifth Embodiment

Figure 5:
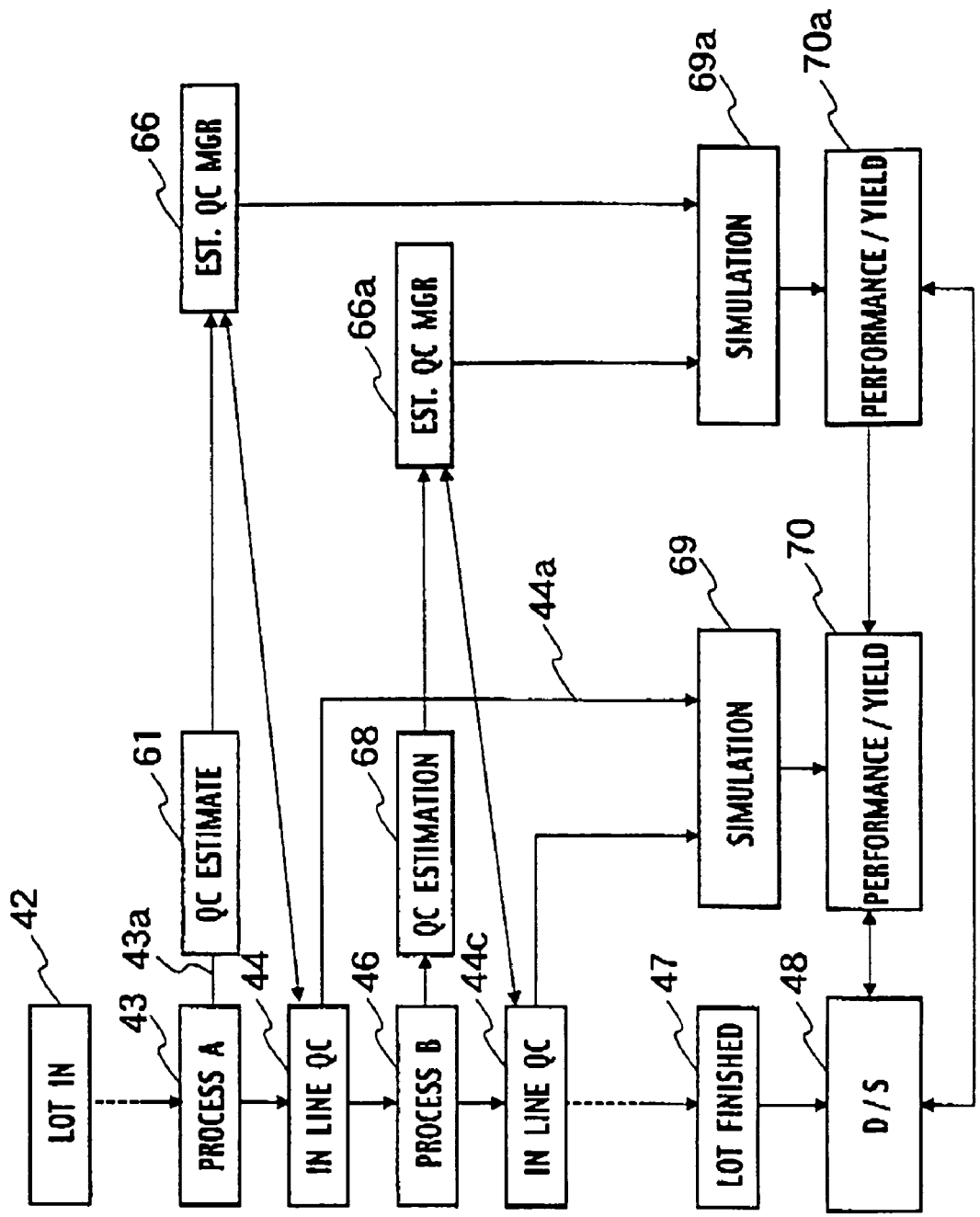
FIG. 5 is a schematic flowchart for explaining a method for manufacturing a semiconductor device according to a fifth embodiment.

FIG. 5 is a schematic flowchart for explaining a method for manufacturing a semiconductor device of a fifth embodiment of the present invention. A lot inputting step 42, a first processing step 43, a first inspection step 44, a second processing step 46, a lot completion step 47, a D/S step 48, and a quality estimation section 61 are the same as those of the aforementioned fourth embodiment and will not be further described.

The method for manufacturing a semiconductor device according to the present embodiment includes a first processing step 43, for example, a deposition processing apparatus a deposition apparatus is part of the entire process, a second processing step 46 located downstream of the first processing step 43, and a D/S step 48 in which device performance and yield of a plurality of semiconductor devices in wafers having undergone a lot completion step 47 are inspected.

In the first processing step 43 in which processing A is performed, apparatus information 43a of a processing apparatus is transmitted to a quality estimation section 61, and the quality estimation section 61 transmits estimated quality data 61a to an estimated quality management section 66 based on the apparatus information 43a. After the current in-process lot of processing A has finished processing, the estimated quality management section 66 can obtain, as comparison data 67, an in-line QC process result of the wafers, which is obtained in the first inspection step 44, and can compare the in-line QC process result with the estimated quality data 61a. Accordingly, the estimated quality management section 66 can determine the accuracy of the estimated quality data 61a.

For example, while comparing the estimated quality data 61a estimated by the quality estimation section 61 and an actually measured value from the first inspection step 44, the estimated quality management section 66 performs a correlation process between the apparatus information 43a and the actually measured value. Here, the correlation process of the present embodiment means the process of approximating the estimated quality data 61a estimated by the quality estimation section 61 to the actually measured value. Apparatus information 43a obtained for each lot is fed back to a semiconductor manufacturing process of the first processing step 43, and the apparatus information 43a can be corrected to be approximated to an actually measured value when the next lot is processed. Accordingly, the correlation process makes it possible to appropriately modify a parameter of a calculated model of the estimated quality data 61a in the quality estimation section 61.

For example, the gap between the estimated quality data 61a and an actually measured value after the estimated quality management section 66 has performed the correlation process for ten lots is reduced so that first inspection step 44 (in line QC) and a third inspection step 44c (in-line QC) decrease. The yield of a lot processed in an upstream (or precedent) step can be estimated by transferring yield information of a lot on which processing A has been performed in the first processing step 43, to a process and device simulation apparatus 69a connected to the estimated quality management section 66.

Similarly, the second processing step 46 in which processing B is performed transmits apparatus information of an apparatus for conducting a process of the second processing step 46 to a quality estimation section 68, and the quality estimation section 68 transmits QC information 68a as estimated quality data to an estimated quality management section 66a based on the received apparatus information. After the current lot of processing B has finished processing, the estimated quality management section 66a obtains, as comparison data 67a, QC information 44d which is wafer inspection result data by the third inspection step 44c, and can compare the QC information 44d with the QC information 68a.

The estimated quality management section 66a performs the correlation process between apparatus information and an actually measured value while comparing the QC information 68a estimated by the quality estimation section 68 and the QC information 44d actually measured in the third inspection step 44c.

For example, the gap between the QC information 68a and an actually measured value after the estimated quality management section 66a has performed the correlation process for ten lots is reduced so that the third inspection step 44c (in-line QC) for inspecting wafers carried out of the second processing step 46 for conducting processing B decrease. The yield of a lot processed in a downstream (or subsequent) step can be estimated by transferring yield information of a lot on which processing B has been performed in the second processing step 46, to the process and device simulation apparatus 69a connected to the estimated quality management section 66a.

The process and device simulation apparatus 69a simulates a semiconductor manufacturing process based on yield information of the first processing step 43 as the upstream step and yield information of the second processing step 46 as the downstream step, and transmits estimated yield information of each lot to a device performance yield estimation section 70a in the subsequent stage.

The above-described device performance yield estimation section 70a estimates the yield of semiconductor devices based on information estimated by the estimated quality management sections 66 and 66a. Furthermore, in the present embodiment, the yield of semiconductor devices can be estimated in an intermediate processing step based on an actually measured value by collecting QC information 44a of the first inspection step 44 and QC information 44d of the third inspection step 44c by in-line QC processes.

The process and device simulation apparatus 69 merges the QC information 44a by the first inspection step 44 and the QC information 44d of the third inspection step 44c to perform a process and device simulation, and transmits yield information as the simulation result to a device performance yield estimation section 70 in the subsequent stage.

The device performance yield estimation section 70 transmits yield estimation information 72 for each lot to the aforementioned device performance yield estimation section 70a. The device performance yield estimation section 70a compares the estimated yield information and the yield estimation information 72, and performs a semiconductor device yield estimation process 75, whereby a more precise yield estimation can be provided. In parallel to the yield estimation process 75, the frequency of precision measurement of in-line QC by the first and second inspection steps 44 and 44c can be reconstructed (e.g., inspection is omitted or reduced).

Furthermore, the semiconductor device manufacturing system according to the present embodiment estimates the yield of semiconductor devices from estimated quality based on apparatus process information respectively provided for the first and second processing steps 43 and 46, and estimates the yield of semiconductor devices based on the inspection result of wafers carried out at each processing step. In parallel to the estimated yield, a probe tester (inspection equipment) can determine device performance yield for wafers of the lot completion step 47, in the D/S step 48.

The simulation precision of the device performance yield estimation section 70 can be corrected based on the difference obtained by a comparison process 71 between the yield actually measured in the D/S step 48 and the yield of the device performance yield estimation section 70, and the simulation precision of the device performance yield estimation section 70a can be corrected based on the difference obtained by a comparison process 73 between the yield actually measured in the D/S step 48 and the yield of the device performance yield estimation section 70a. That is, parameters of simulator models in the process and device simulation apparatuses 69 and 69a can be appropriately modified.

With the semiconductor device manufacturing system described in the present embodiment, yield can be estimated with high precision if a semiconductor manufacturing process is repeated while each yield estimation is being corrected based on the actually measured yield of semiconductor devices. Accordingly, for example, the semiconductor device manufacturing system of the present embodiment has the following advantages: non-product wafers (NPW) as wafers for quality control can be omitted, an inspection step as in-line QC can also be omitted, and a single-wafer simulation of a semiconductor manufacturing process for each lot can be executed.

Sixth Embodiment

Figure 6:
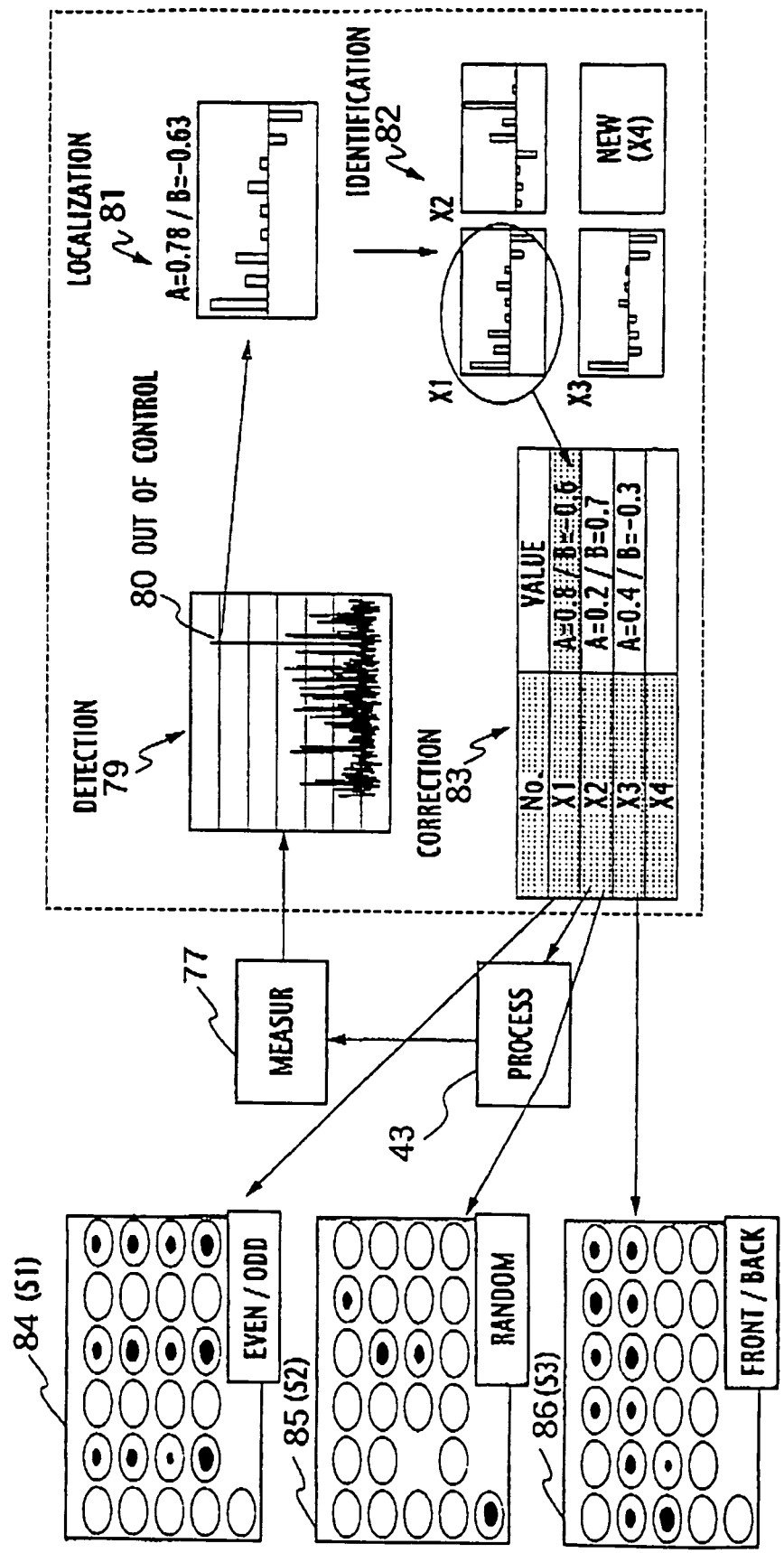
FIG. 6 is a diagram for explaining a method for identifying a manufacturing apparatus which has produced a defective lot of a semiconductor device, according to a sixth embodiment.

FIG. 6 is a diagram for explaining a method for identifying a manufacturing apparatus that has produced a defective lot of semiconductor devices, according to a sixth embodiment of the present invention. Although the semiconductor device processing step in the drawing will be described using an oxidation heat element, a processing apparatus used in a first processing step 43 in the present embodiment is not limited to an oxidation heat element but, as a matter of course, can be applied to a processing apparatus for conducting an other semiconductor manufacturing process.

In the first processing step 43, such as an oxidation process, oxide films are formed on wafers by a thermochemical reaction process in a chamber inside the processing apparatus. In the processing apparatus used in the first processing step 43, apparatus information, such as pressure, temperature, voltage, and the degree of opening of a valve, is transmitted in real time from a plurality of sensors which are connected to a measuring device 77 and which are placed inside the chamber, to the measuring device 77.

The measuring device 77 determines the state of wafers in the semiconductor manufacturing process based on various kinds of received detection data. For example, a processed wafer lot can be identified for each recipe of the semiconductor manufacturing process by collecting of data from the chamber in the processing apparatus performing the first processing step 43.

The measuring device 77 has the capability of collecting data in real time. For example, nine types of analog data simultaneously detected at predetermined time intervals are converted into digital data, and the digital data are recorded and analyzed in chronological order for each lot. In the histogram at the center of the drawing, states of the interior of the chamber, collected by the measuring device 77, are stored in chronological order, and this stored chronological data are converted into scalars and displayed as detection values 79 (detection). Out of the detection values 79, low peak values for which process control can be performed and a non-controllable value 80 which is represented by a high peak value and for which process control cannot be performed, can be confirmed on a display.

The measuring device 77 analyzes a chamber state corresponding to predetermined processing time of the processing step 43, based on the scalar indicated by the non-controllable value 80. Numerical information obtained by conducting characteristic quantification 81 (localization) on characteristic quantities inside the chamber is displayed as a graph. This characteristic quantification 81 indicates what defect exists in a specific portion of a wafer of what ordinal number in an in-process lot. For example, calculation is performed based on the detected non-controllable value 80 by setting the values of parameters A and B as characteristic quantities (or element information) for example inside the chamber to 0.78 and −0.63, respectively, A characteristic quantity database (not shown) for storing digital information of the characteristic quantification 81 inside or outside the measuring device 77 is accessed to perform a fault identification process 82 as a real time defect identification process.

The characteristic quantity database used in the above-described fault identification process 82 can perform management in the form of a correlation table 83 by computer 11 (see the FIG. 1) and can be used in correction of the state of an apparatus, such as an oxidation heat element, of the processing step 43. For example, in the case where the fault identification process 82 is performed on the characteristic quantities (A=0.8/B=−0.6) in the right column which correspond to X1 represented in the column for a defect class number parameter in the left column of the correlation table 83, and parameter A is 0.78 and parameter B is −0.63 for the characteristic quantities calculated by the measuring device 77, statistical data is recorded which indicates that the lot state of wafers is as shown in the lot state 84 with defective portions shown at the upper left of the drawing. That is, a many non-defective product wafers and a few non-defective product wafers are produced, alternating between odd ordinal numbers and even ordinal numbers. Such statistical data also contains recipe information of the semiconductor manufacturing process and the design standard is determined based on the results of the reliability evaluation of TEG (Test Element Group) information. Thus, testing history and semiconductor device classification information can also be included in the data.

Note that there are cases where a certain difference in EES signals among a plurality of chambers has been detected in the processing step 43, such as an oxidation process, for wafer processing identified by characteristic values in the right column which correspond to X1 in the left column of the correlation table, and that an estimated failure mode of the processing apparatus can be identified.

For the lot state of wafers on which the fault identification process 82 is performed by the defect class number X2 of a defect pattern represented in the left column of the correlation table 83, numerical information in which the values of parameters A and B are respectively represented as 0.2 and 0.7 to the first decimal place, is read as characteristic quantities stored in the characteristic quantity database. In the case where the numerical information is close to the data denominated by the characteristic quantification 81 as the result of comparing the numerical information with the data denominated by the characteristic quantification 81, the processing step 43 that is evaluated based on the statistical data this lot state of the wafers is as shown in the lot state 85 at the middle on the left of the drawing, that is, few non-defective product wafers are produced in a random state.

Similarly, for the lot state of wafers on which the fault identification process 82 is performed by the defect class number X3 of a defect pattern represented in the left column of the correlation table 83, numerical information in which the values of parameters A and B are respectively represented as 0.4 and −0.3 to the first decimal place, is read as characteristic quantities stored in the characteristic quantity database. In the case where the numerical information is close to the data denominated by the characteristic quantification 81 as the result of comparing the numerical information with the data denominated by the characteristic quantification 81, the processing step 43 is evaluated based on statistical data indicating that this lot state of the wafers is as shown in the lot state 86 at the lower left of the drawing, that is, a lot in which few non-defective product wafers exist in the first half of the lot and in which many non-defective product wafers exist in the second half of the lot. Note that the yield of a wafer of a lot corresponding to the defect class number X3 can be improved by, for example, a correction process in which the of number defects decreases as the temperature in the heat element of the processing step 48 gradually rises.

As described above, the measuring device 77 detects the state of the chamber in the processing step 43 in real time, and performs the characteristic quantification 81 and the fault identification process 82. Accordingly, at the stage at which a lot with many defectives has been detected by the fault identification process 82, a processing step 43 producing a failure can be automatically identified. Accordingly, in the case where a lot with many defects has been detected, a processing step 43 producing a defective lot should be immediately stopped, and an operator should be notified to perform maintenance on the apparatus. Note that, for a lot classified into a new pattern by the characteristic quantification 81, a "new symbol" shown at the lower right of the drawing can be assigned to record the characteristic quantities and information indicating the lot state of wafers in the aforementioned characteristic quantity database.

Seventh Embodiment

Figure 7:
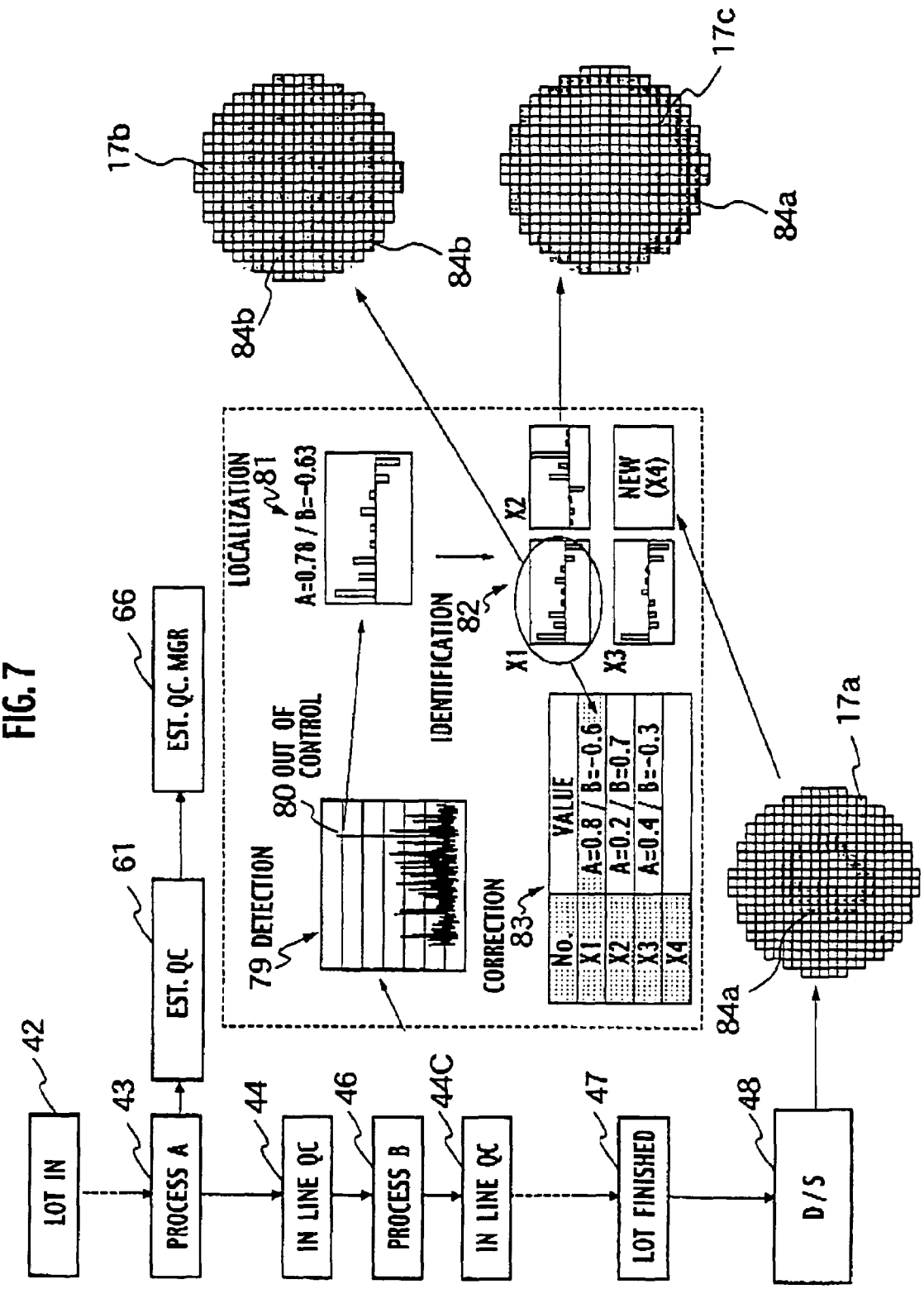
FIG. 7 is a schematic flowchart for explaining a method for manufacturing a semiconductor device according to a seventh embodiment.

FIG. 7 is a schematic flowchart for explaining a method for manufacturing a semiconductor device of a seventh embodiment of the present invention. A lot inputting step 42, a first processing step 43, a first inspection step 44, a third inspection step 44c, a second processing step 46, a lot completion step 47, a D/S step 48, a quality estimation section 61, an estimated quality management section 66, a detection value 79, a non-controllable value 80, characteristic quantification 81, a fault identification process 82, a correlation table 83, and new symbols are the same as those of the above-described example and will not be further described.

In a semiconductor device manufacturing system, the class numbers of defect parameters X1, X2, and X3 and a plurality of characteristic quantities corresponding to a wafer 17b having defective portions 84b and a wafer 17c having a defective portion 84a which are related to known information denominated by characteristic quantification 81, are stored in a characteristic quantity database, and a defective lot can be detected by conducting fault identification 82 on a lot denominated by characteristic quantification 81. However, for a lot in which a wafer 17a having a defective portion 84a as an unknown defect pattern that has been processed, a lot-out process and a maintenance process are difficult.

On the other hand, in the present embodiment, apparatus information collected, in real time, from a processing apparatus for conducting the processing step 43 in the quality estimation section 61 is transmitted while being related to each lot. Thereafter, a wafer 17a which has finished downstream steps and has passed through the lot completion step 47 is inspected in the D/S step 48, and the ultimate defective portion 84a is specified.

In the D/S step 48, a lot number and the address of the detective portion are stored in data base 12 (shown FIG. 1) or outputted by computer 11 (shown FIG. 1). Accordingly, the semiconductor device manufacturing system retrieves the apparatus information (e.g., refer to reference numeral 43a of FIG. 2) of an apparatus used in the processing step 43 in which processing A has been performed on the lot, including the lot number, commands the quality estimation section 61 to monitor the retrieved apparatus information 43a as defective lot information, and controls the quality estimation section 61 so that parameters in the quality estimation section 61 are automatically updated. Since the estimated quality management section 66 receives estimated quality data from the quality estimation section 61 as described previously and estimates the yield of semiconductor devices, a lot having a defect pattern as in the wafer 17a is excluded at an early stage from the line of the semiconductor device manufacturing system in a semiconductor manufacturing process after detecting the defect pattern. Thus, a chemicals and the like can be effectively prevented from being consumed excessively.

As a matter of course, in the semiconductor device manufacturing system, characteristic quantity information of a newly detected defect pattern can be automatically registered in the characteristic quantity database while being assigned, as a new symbol, a defect class number X4 of a defect parameter in the correlation table 83.

Eighth Embodiment

The semiconductor device manufacturing system according to the eighth embodiment of the present invention includes a processing apparatus 14a that executes processing of a wafer 17a, a processing apparatus 14b that executes processing of a wafer 17b, a processing apparatus 14c that executes processing of a wafer 17c, a processing apparatus 14d that executes processing of a wafer 17d, self-diagnosing apparatuses 5a though 5d which are provide with each of the processing apparatuses 14a through 14d respectively, data bases 13a through 11d which are provided on each of the self-diagnosing apparatuses 5a though 5d respectively, inspection equipment 19a that inspect the wafer 17an inspection equipment 19b that inspect the wafer 17b, inspection equipment 19c that inspect the wafer 17c, and inspection equipment 19d that inspect the wafer 17d, and a computer 11 that receives the quality estimation value of each of the wafers 17a through 17d, and is connected to the self-diagnosing apparatuses 5a through 5d.

The same hardware resources and compatible software constitutes the self-diagnosing apparatuses 5a though 5d used in the eighth embodiment as the self-diagnosing system 11a used in the first embodiment. Thus, the self-diagnosing apparatuses 5a though 5d receive the apparatus information of the processing apparatuses 14a though 14d and execute self-diagnosis.

The computer 11 connected to the self-diagnosing apparatuses 5a though 5d stores the quality estimation value of all of the wafers 17a through 17d into a memory. The computer 11 also receives the results of the testing of a wafer in a lot selected from a plurality of lots, which are sent by the inspection equipment 19a though 19d at each inspection timing point, and stores the inspected quality value (factors such as: film thickness, etching rate, impurity diffusion depth, state of melting, for example) which is based on inspection results, into a memory apparatus 12, corresponding to a lot number and a wafer number.

The inspection equipment 19a through 19d inspect only the representative wafer, and the computer 11 receives the inspection results corresponding to a lot number and a representative wafer number.

The wafer(s) that has not been inspected is estimated as having quality equivalent to that of the representative wafer, and the computer 11 stores a value into the memory corresponding to a lot, number and a wafer number, and conducts quality control for each wafer. Thus, the computer 11 stores the quality estimation value of all of the wafers in all of the lots into the memory based on lot numbers and wafer numbers, and stores the inspected quality value of a wafer on part of a lot. This inspected quality value is output at every inspection timing point.

The computer 11 conducts quality control of an entire manufacturing system using the APC and MES data stored in the main database 13, and executes various different processes with respect to a plurality of processing apparatuses 14a through 14d. In an example in which the processing apparatus 14a executes an oxidation film production process on the wafer 17a, the processing apparatus 14b executes an etching process on the wafer 17b, the processing apparatus 14c is executes an impurity diffusion process on the wafer 17c, and the processing apparatus 14d is executes a reflow (or melting) process on the wafer 17d.

However, although the processing apparatuses 14a through 14d are described as four units for the sake of simplicity of description, semiconductor manufacturing systems in modern LSI manufacturing processes have a plurality of identical processing apparatuses, the number of processing apparatuses generally being ten or more units.

Each of the processing apparatuses 14a through 14d is configured to output apparatus information through various sensors. This apparatus information expresses the state of conditions in the interior of the apparatus. In an instance of a plasma process apparatus, process regulated apparatus information such as the pressure, temperature, high frequency electric power value, the value of the capacitor that aligns impedance, and the flow rate of the gas inducted into the interior of the chamber is output to each of the self diagnosing apparatuses 5a through 5d.

The self-diagnosing apparatus 5a is connected to the apparatus information storing date base 13a, receives information from the processing apparatus 14a processing the wafer 17a according to EES, calculates the quality estimation value (The thickness of the film formed on top of the wafer 17a, in an instance in which an oxidation heat element is the processing apparatus 14a) corresponding to the wafer 17a based on the apparatus information, and sends this quality estimation value corresponding to the wafer 17a to the computer 11 while storing the quality estimation value in the memory of the database 13a.

Also, the term 'quality estimation value' refers to an estimated value Ye of the film thickness formed on top of the wafer 17a, which is derived by substituting apparatus information X, sent from the processing apparatus 14a, into a model film thickness formation equation (Ye=a X+b). The apparatus information can be factors like heater temperature and gas flow rate, and the database 13a stores a model film thickness formation equation for all apparatus information. The self-diagnosing apparatus 5a inputs apparatus information into the model film thickness equation and derives the quality estimation value.

The self-diagnosing apparatus. 5b is connected to the apparatus information date base 13b, receives information from the processing apparatus 14b processing the wafer 17b according to EES, calculates the quality estimation value (the etching rate, in an instance in which a dry etching apparatus is the processing apparatus 14b) corresponding to the wafer 17b based on the apparatus information, and sends this quality estimation value corresponding to the wafer 17b to the computer 11 while storing the quality estimation value in the memory of the database 13b.

The self-diagnosing apparatus 5c is connected to the apparatus information date base 13c, receives information from the processing apparatus 14c processing the wafer 17c according to EES, calculates the quality estimation value (the diffusion depth of impurities, in an instance in which a diffusion heat element is the processing apparatus 14c) corresponding to the wafer 17c based on the apparatus information, and sends this quality estimation value corresponding to the wafer 17c to the computer 11 while storing the quality estimation value in the memory of the database 13c.

The self-diagnosing apparatus 5d is connected to the apparatus information date base 13d, receives information from the processing apparatus 14d processing the wafer 17d according to EES, calculates the quality estimation value (the reflow state of an isolation film, in an instance in which an annealing heat element is the processing apparatus 14d) corresponding to the wafer 17d based on the apparatus information, and sends this quality estimation value corresponding to the wafer 17d to the computer 11 while storing the quality estimation value in the memory of the database 13d.

Figure 8:
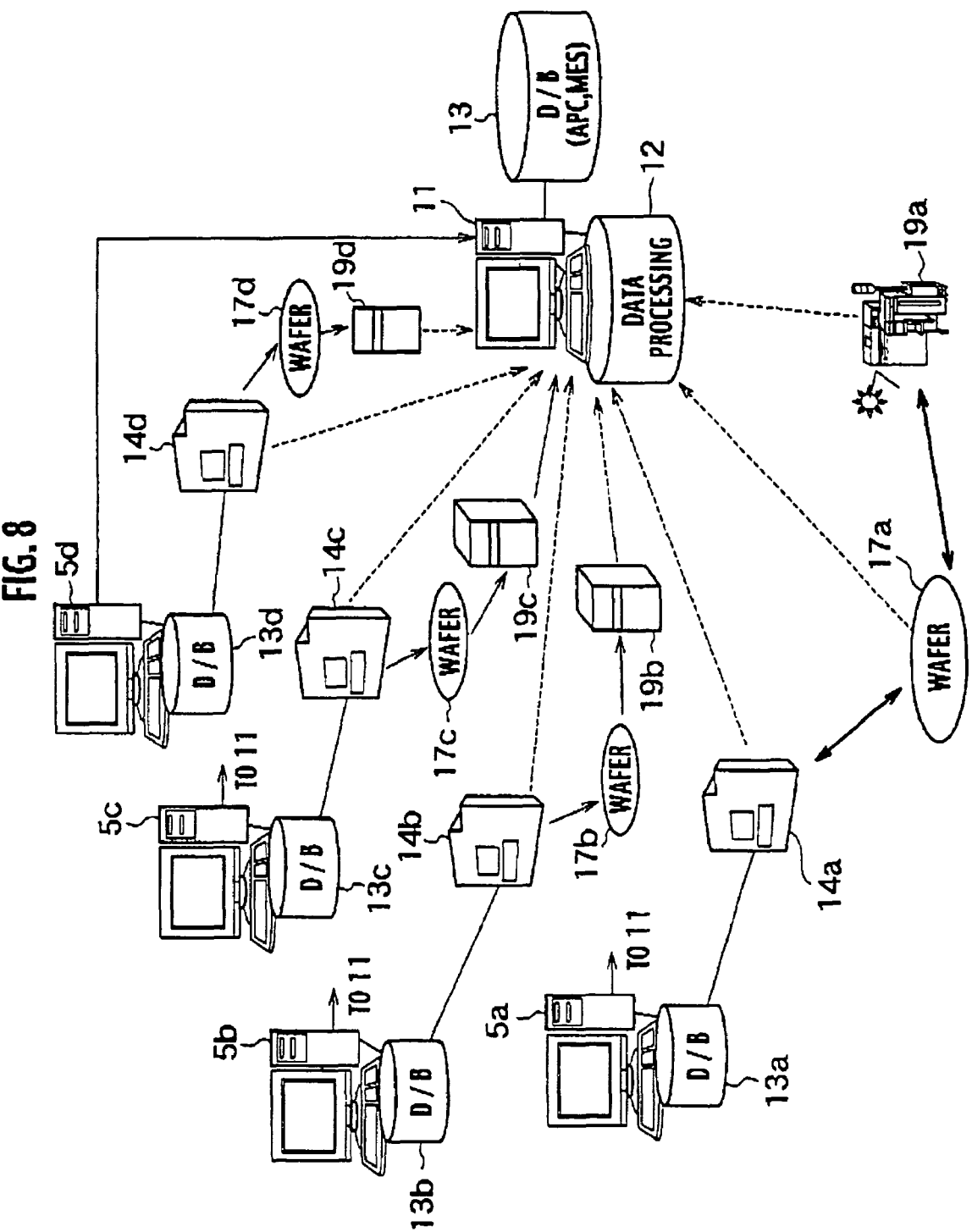
FIG. 8 is a schematic block diagram for explaining a system of manufacturing a semiconductor device according to an eighth embodiment.

The operation of a manufacturing system of a semiconductor device using the etching stage in a wafer manufacturing process as an example will be described in reference to FIGS. 8 and 9. In the manufacturing system, an inspected quality value Yq, which falls in the range of an expected value, is extracted and compared to the quality estimation value Ye, and a model of the estimated value Ye is updated following the operation described next.

Here the term 'expected value' refers to an inspected quality value that is suitable and expected at the present time. An expected value is derived by chronologically lining up inspected quality values Yq which had been previously stored in the memory apparatus and deriving the trend of the inspected quality values Yq.

(Re-Inspection)

Below, out of the group of the processing apparatuses 14a, 14b, 14c, and 14d, the processing apparatus 14b, which is a dry etching apparatus, will be described as an example.

(a) In step 90 ('step' is referred to as 'S' hereinafter) wafers 17b, which have been processed by the processing apparatus 14b, are regularly inspected by the inspection equipment 19b. Computer 11 receives the results of the testing. At this stage the sequence advances to abnormality check S91. The computer 11 converts the inspection results to the inspected quality value Yq, compares the inspected quality value Yq to an expected value stored in the memory apparatus 12, and judges whether or not there is an abnormality in the inspected quality value Yq. When there is an abnormality present, the sequence branches to re-measure S92 and sends a re-measuring command to the inspection equipment 19b.

(b) In the re-measure S92, the inspection equipment 19b sends the results of the re-measuring of the wafer 17b to the computer 11.

(c) In re-measuring S92, the computer 11 converts the results of re-measuring to the inspected quality value Yq, compares the inspected quality value Yq to an expected value, and in a case determined as abnormal the sequence advances to mail sending S93 and sends an e-mail to a person in charge of the process notifying of an occurrence of an abnormality on the wafer 17b.

(d) The sequence advances to history updating S94, and records the abnormality of the wafer 17b in the memory apparatus 12, and updates a database corresponding to wafer numbers, wafer lot numbers, and the processing apparatus 14b that processes a wafer.

(Actual Inspection Value Comparison)

(a) The computer 11 compares the re-measured inspected quality value Yq received in the re-measuring S92 to an expected value and in a case in which the inspected quality value Yq is judged as suitable, the computer 11 stores the history of the re-measuring corresponding to the inspection equipment 19b and the wafer 17b in the memory apparatus 12, and advances to quality estimation comparison S96 via node 95.

(b) The sequence advances to the quality estimation comparison S96 even in a ease in which the inspected quality value Yq is judged as suitable in the abnormality check S91.

(c) In the quality estimation comparison S96 the computer 11 compares the estimated value Ye derived by the self-diagnosing apparatus 5b with the inspected quality value Yq, and determines whether or not the results are compliant with a judgment or determination standard. In a case in which the estimated value Ye is within the regression line's reliability zone, a judgment of being 'conforming' is issued, and in a case in which the estimated value Ye departs from the reliability zone, a judgment of 'non-conforming' is issued.

(d) In the quality estimation comparison S96 that is determined as 'non-conforming', the sequence advances to factor decision processing S97, and adjusts self-diagnosing parameters. Note the following equation (1) expressing an example of a self-diagnosing parameter.

$$Ye1 = aX1 + b \quad (1)$$

Computer 11 stores a current quality estimation value 'Ye1c' in the memory apparatus 12, and stores a new quality estimation value 'Ye1n', which has either an 'a' coefficient or a 'b' coefficient, or both the 'a' and 'b' coefficients changed, in the memory apparatus 12.

(e) In the factor decision processing S97, the computer 11 refers to the history of the inspected quality value Yq stored in the memory apparatus 12, and compared the inspected quality value Yq with the increases and decreases of a past quality estimation value 'Yq1c' and the quality estimation value 'Ye1n' judged as 'non-conforming', and decides whether or not to add a change to the 'a' coefficient, a change to the 'b' coefficient, apparatus information 'X1' or differing apparatus information 'Xn' in order to bring the quality estimation value 'Ye1n' closer to the inspected quality value Yq.

(f) In a case in which the quality estimation value 'Ye1n', as compared with the past quality estimation value 'Yq1c', is determined to have shifted unexpectedly, the computer 11 in the apparatus information adding S98, adds the apparatus information 'X1' and the differing new apparatus information 'Xn', advances to an estimation equation updating S101 and records new self-diagnosing parameters in the database 13b via the self-diagnosing apparatus 5b.

(g) In the case in which the quality estimation value 'Ye1n', as compared with the past quality estimation value 'Yq1c', is determined to have changed stable, the computer 11 in the 'a' change S99 increases or decreases the 'a' coefficient to bring the quality estimation value 'Ye1n' closer to the inspected quality value Yq, advances to the estimation equation updating S101 and records new self-diagnosing parameters in the database 13b via the self-diagnosing apparatus 5b.

(h) In the case in which the quality estimation value 'Ye1n', as compared with the past quality estimation value 'Yq1c', is determined to have changed stable, the computer 11 in 'b' change S100 increases or decreases the 'b' coefficient to bring the quality estimation value 'Ye1n' closer to the inspected quality value Yq, advances to the estimation equation updating S101 and records new self-diagnosing parameters in the database 13b via the self-diagnosing apparatus 5b.

(i) Thereinafter, the sequence advances to the mail sending S102 and sends an e-mail to a person in charge of the process and executes a report of the updating of the new self-diagnosing parameters.

(j) The sequence advances to the history updating S94, records abnormality of the wafer 17b in the memory of the memory apparatus 12, and updates the database corresponding to wafer numbers, wafer lot numbers, and the processing apparatus 14b that processes a wafer.

(k) In the quality estimation comparison S96 in a case in which a judgment or determination of 'conforming' is issued, the sequence branches off to specification confirmation S106, and judges whether or not the quality estimation value 'Ye1n' lies within a standard. In a case in which the quality estimation value 'Ye1n' lies within a standard, the sequence advances to the history updating S94 and records a normal state of the wafer 17b in the memory apparatus 12, and updates the database corresponding to wafer numbers, wafer lot numbers, and the processing apparatus 14b that processes a wafer.

Here, the term 'standard' refers to the standard values that are regulated alike in each semiconductor device manufacturing process, and differs with the expected value put forth above.

(Sensor Abnormality Notification)

(a) In a start S90 in a case in which a lot of the wafer 17b is conveyed to the processing apparatus 14b and processing has begun, the sequence advances to a sensor check S103 and inspect the operation of the various sensors provided to the processing apparatus 14b. For example, the computer 11 determines whether or not sensors such as gas etching sequence sensors, high frequency power supply sensors, and chamber pressure sensors, which output apparatus information that affects etching, are operating normally or not. When operation is determined to be normal, the sequence advances to quality estimation calculation S104, and in a case in which even one of the sensors is determined to be operating abnormally, the sequence branches to a sensor abnormality notification S113.

(b) In the sensor abnormality notification S113 the computer 11 receives a sensor abnormality notice corresponding to the apparatus information of the processing apparatus 14b from the self-diagnosing apparatus 5b, refers to the processing apparatus's (14b) sensor history information stored in the memory of the memory apparatus 12, and extracts history information related to the sensor that was determined to be operating abnormally. The computer 11 creates the aforementioned email regarding factors such as the amount of elapsed time from a previous abnormality occurrence to the determination of a next abnormality occurrence (or a time period of continuous normal operation), the number of times an abnormality has occurred on the processing apparatus 14b since being established on a production line, and the normal recommended value based on the trend of apparatus information of the processing apparatus 14b during normal operation.

(c) The sequence advances to a mail sending S114 and sends a mail created in the sensor abnormality notification S118 to someone in charge of the process, notifying of an abnormality of a sensor of the processing apparatus 14b, thus completing the processing.

(Quality Estimation Calculation)

(a) The self-diagnosing apparatus 5d advances from the start S90 to a sensor check S103, and advances to a quality estimation calculation S104 in a case in which all sensors are operating normally, and in the stage in which the wafer 17b is conveyed to the processing apparatus to start processing. The self-diagnosing apparatus 5d begins the acquisition of apparatus information [X1] such as the capacitance for adjustment of impedance, calculates the quality estimation value Ye1 using the equation (1), and advances to a quality control S105.

(b) The computer 11 receives the wafer's (17b) quality estimation value Ye1 that was calculated by the self-diagnosing apparatus 5d in the quality control S105, while determining whether or not the wafer 17b has been inspected by the inspection equipment 19b, based on lot and wafer numbers.

In a case in which the wafer 17b is determined as having been inspected, the sequence branches off to the quality estimation comparison S96, executing the actual-measured-value comparison sequence sequence. On the other hand, in a case in which the wafer 17b is determined as not having been inspected, the sequence branches off to a spec confirmation S106.

(c) In the spec confirmation S106 the computer 11 determines whether or not the quality estimation value Ye1 lies within a standard. In a case in which the quality estimation value Ye1 is determined to be within a standard, the sequence advances to a history updating S94, and the computer 11 records the normal state of the wafer 17b in the memory apparatus 12, updates the database corresponding to wafer numbers, wafer lot numbers, and the processing apparatus 14b that processes a wafer, and ends the processing.

On the other hand, in a case in which the quality estimation value Ye1 is determined to be outside of a standard in the spec confirmation S106, the sequence of the computer 11 branches off to an additional inspection decision S107.

(d) In a case in which additional inspection is ordered by the instructions of someone in charge of the process in the additional inspection decision S107, the sequence branches off to an additional quality control S108, and the quality inspection value Yq, which is the converted results of the wafer 17b being inspected by the processing apparatus 19b is stored in the memory apparatus 12 corresponding to the wafer 17b.

(e) The sequence of the computer 11 advances from processing to a quality estimation comparison S96, the computer 11 compares the quality inspection value Yq stored in the memory apparatus 12 in the additional quality control S108 with the quality estimation value Ye1, and executes an actual-measured-value comparison sequence sequence.

(f) In a case in which additional inspection is not ordered by the instructions of someone in charge of the process in the additional inspection decision S107, the sequence advances to a top component report S109. The computer 11 compares the past quality estimation value Ye1c stored in the memory apparatus 12 with the quality estimation value Ye1n determined to be either within or not within a standard in the spec confirmation S106, and from the models calculates the quality estimation value Ye1 expressed by the equation (1) with an upper component having a large inconsistency (for instance, the top coefficient 'a' and the next coefficient 'b'), and creates the previously identified email.

In the top component report S109, the computer 11 stores the quality estimation value Ye1n determined to be either within or not within a standard in the spec confirmation S106 in a database of the memory apparatus 12 while referencing the history of the past quality estimation value Ye1c stored in a database, searches whether or not there was a similar abnormality in the past, and creates an email based on the results of the search.

(g) The sequence of the computer 11 advances to a mail sending S110 sending an email created in the top component report S109 to someone in charge of the process, notifying of an occurrence of an abnormality in the quality estimation value Ye1 of the wafer 17b.

In this fashion, with a system of manufacturing a semiconductor device according to the eighth embodiment of the present invention, the computer 11 compares the quality estimation value Ye1 calculated by the self-diagnosing apparatus 5d with the quality inspection value Yq that is acquired regularly by the inspection equipment 19b. Because the computer 11 changes or modifies a coefficient of an estimation circuit based on the difference of the quality estimation value Ye1 and the quality inspection value Yq, it is possible to increase the precision of the self diagnosis of the processing apparatus 14b.

Figure 9:
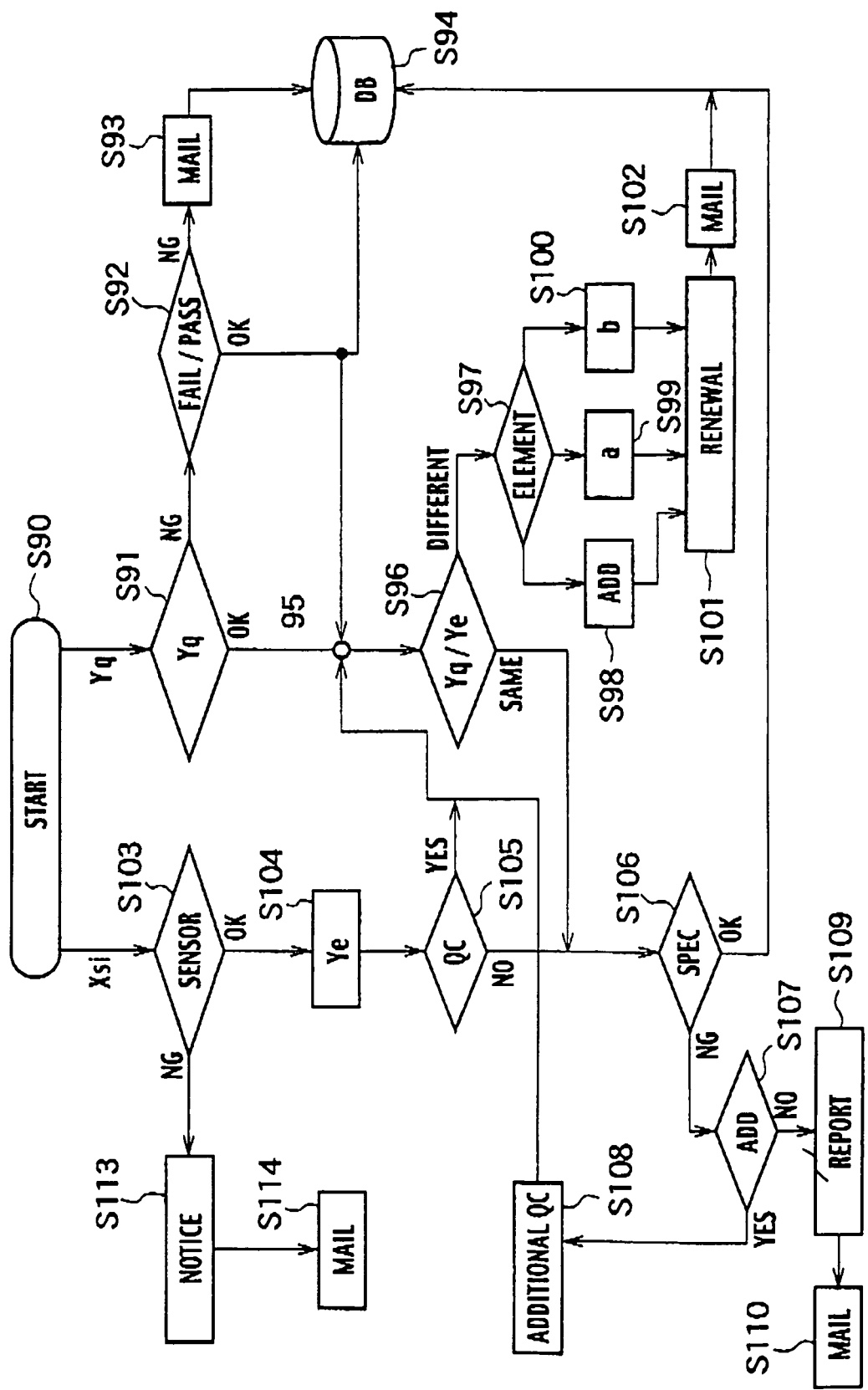
FIG. 9 is a schematic flowchart for explaining a method for manufacturing a semiconductor device according to the eighth embodiment.
Figure 10:
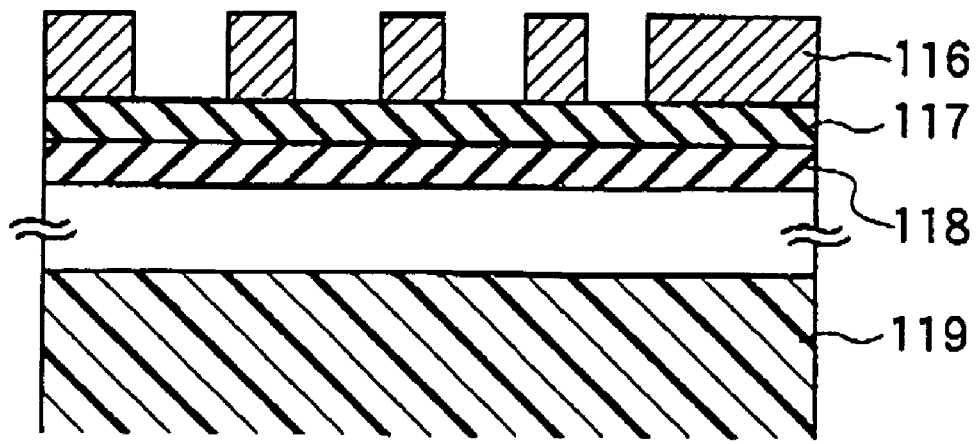
FIG. 10 is a schematic sectional view of a semiconductor device for the eighth embodiment.

A cross section view of a wafer used in the quality estimation calculation S104 in FIG. 9 is shown in FIG. 10. The processing apparatus 14b conveys a wafer to the interior of a chamber. The wafer being conveyed includes a film structure of a tetraethoxysilane TEOS118, and a reflection prevention film 117 formed on top of the TEOS118. Further, the interlayer isolation film of the present invention is not limited to TEOS but can employ other thin film semiconductor materials such as TMPO or TEM as well.

On the surface of the reflection prevention film 117, there is a region having a resist 116 that has been lithographically exposed, and a region in which the resist 116 has been removed exposing the reflection prevention film 117.

The processing apparatus 14b executes etching of the reflection prevention film 117 in regions where the reflection prevention film 117 has been exposed until the TEOS118 is exposed.

The self-diagnosing apparatus 6b receives a plurality of apparatus information Xi, ('i' is a number reflecting the amount of gathered information in existence) such as the sequence rate of the etching gas (carbon fluorinate CF4, hydrobromic acid, oxygen, etc.) used to etch the reflection prevention film 117, the parameters related to the high frequency power supply, such as the traveling wave of the high frequency power supply and the reflected wave of the high frequency power supply and pressure, from the processing apparatus 14b.

In order to calculate the quality estimation value Ye1 of the etching rate, the self-diagnosing apparatus 5b acquires the capacitance value of the capacitor, which regulates the chamber impedance, as apparatus information. Further, the self-diagnosing apparatus acquires the sequence rate of the etching gas as apparatus information X2, and the action of calculating the quality estimation Ye2 of the etching rate is a selection item of the manufacturing process.

Figure 11:
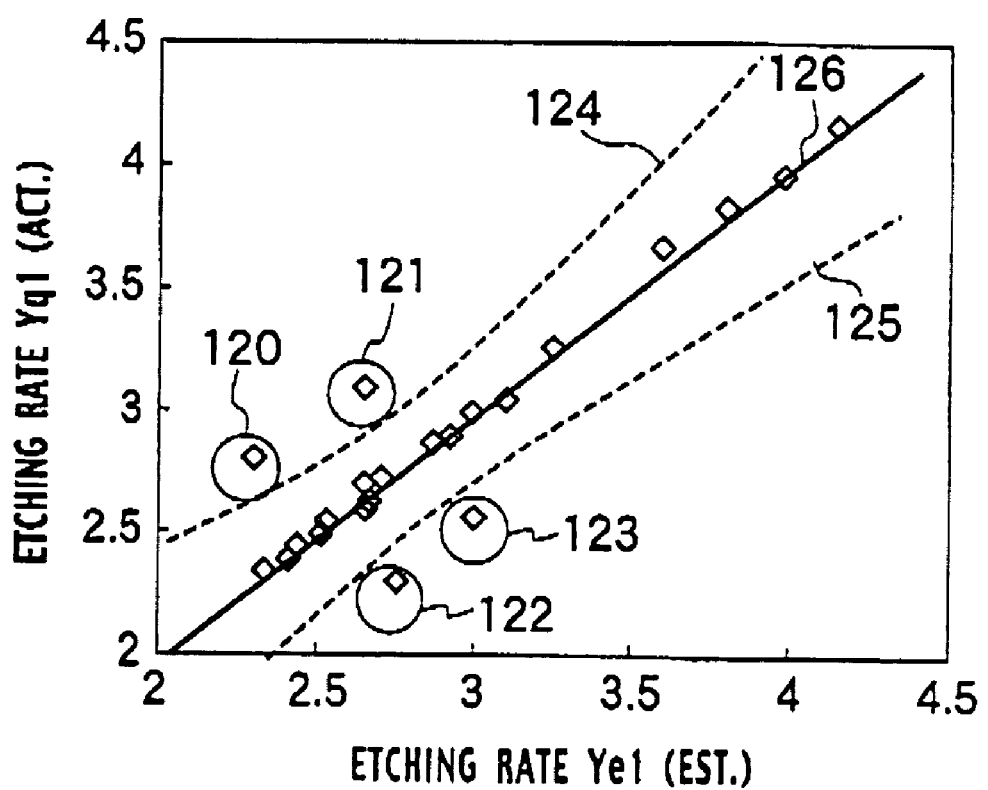
FIG. 11 is a schematic graph for explaining a method for the eighth embodiment.

A graph of the determination standards using the quality estimation comparison S96 of FIG. 9 is shown in FIG. 11. The horizontal axis of the graph shows the quality estimation value Ye1 of the etching rate calculated by the self-diagnosing apparatus 5b, and the vertical axis of the graph shows a quality inspection value Yq1 of the etching rate based on actual measured values of the wafer 17b inspected by the inspection equipment 19b and calculated by the computer 11.

When comparing the quality estimation value Ye1 with the quality inspection value Yq1 in the quality estimation comparison S96, in a case in which the quality estimation value Ye1 is within the reliability zone (the region sandwiched by dotted line 124 and dotted line 125) of the return line of the quality estimation value Ye1 and the quality inspection value Yq1, the computer 11 determines the quality estimation value Ye1 and the quality inspection value Yq1 as 'conforming', and determines the quality estimation value Ye1 and the quality inspection value Yq1 as 'non conforming' in cases where the quality estimation value Ye1 is not within the reliability zone.

The computer 11 calculates the quality inspection value Yq1 of the etching rate corresponding to wafer numbers and based on actual measured values of inspected wafers of a plurality of lots etched by the processing apparatus 14b, and stores the quality inspection value Yq1 in the memory of the memory apparatus 12. The computer 11 also receives the quality estimation value Ye1 of the etching rate corresponding to wafer numbers from the self-diagnosing apparatus 6b, and stores the quality estimation value Ye1 in the memory apparatus 12.

When the model equation that determines the quality estimation value Ye1 is suitable, the wafer having an intersecting node of the quality estimation value Ye1 corresponding to the quality inspection value Yq1 of each wafer number has a quality overlapping or in the vicinity of a return line 126 at an etching rate in the range of '2.3' to '4.3' (nm/second).

However, when there are changes in the pressure in a chamber of the processing apparatus 14b, the value of the capacitor, or the sequence amount of the etching gas, there are cases in which a change occurs in the quality of wafers between lots. For instance, because a difference occurs between the wafers exhibiting the intersecting nodes surrounded by the illustrated circles 120, 121, 122, and 128, corresponding to the quality inspection value Yq1, and the quality estimation value Ye1, it becomes necessary to change the model equation that determines the quality estimation value Ye1, raising the reliability of the quality estimation value Ye1.

For the wafer that exhibits the intersecting node surrounded by the circle 120, the quality inspection value Yq1 is '2.8' and the quality estimation value Ye1 with '2.3' in respect to the quality inspection value Yq1. The parameters of the model equation (1) are changed to increase the quality estimation value Ye1 located on the upper side of the return line 126. For instance, the coefficient 'a' is increased toward the inspection value Yq1.

For the wafer that exhibits the intersecting node surrounded by the circle 121, the quality inspection value Yq1 is '3.1' and the quality estimation value Ye1 is '2.6' with respect to the quality inspection value Yq1. The parameters of the model equation (1) are changed to increase the quality estimation value Ye1 located on the upper side of the return line 126. For instance, the coefficient 'a' is increased toward the inspection value Yq1.

For the wafer that exhibits the intersecting node surrounded by the circle 122, the quality inspection value Yq1 is '2.3' and the quality estimation value Ye1 is '2.8' with respect to the quality inspection value Yq1. The parameters of the model equation (1) are changed to lower the quality estimation value Ye1 located on the bottom side of the return line 126. For instance, the coefficient 'a' is decreased toward the inspection value Yq1.

For the wafer that exhibits the intersecting node surrounded by the circle 123, the quality inspection value Yq1 is '2.5' and the quality estimation value Ye1 is '3.0' with respect to the quality inspection value Yq1. The parameters of the model equation (1) are changed to lower the quality estimation value Ye1 located on the bottom side of the return line 126. For instance, the coefficient 'a' is decrease toward the inspection value Yq1.

Computer 11 refers to data of the time-chart graph for inspecting quality value Yq1, based on the wafer actually measured stored in storage memory 12 when the parameters of the model equation (1) are changed.

Figure 12:
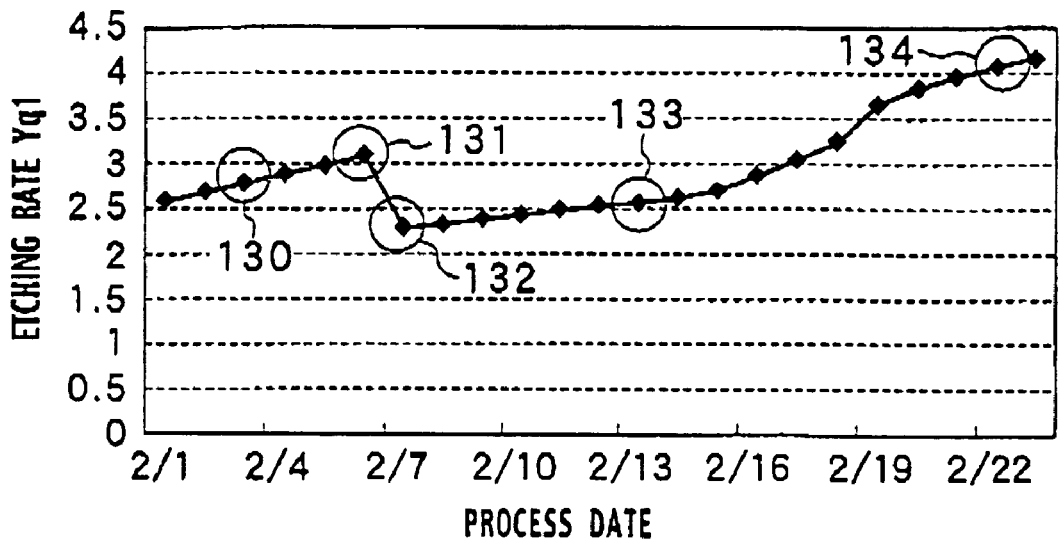
FIG. 12 is a schematic graph for explaining a method for the eighth embodiment.
Figure 13:
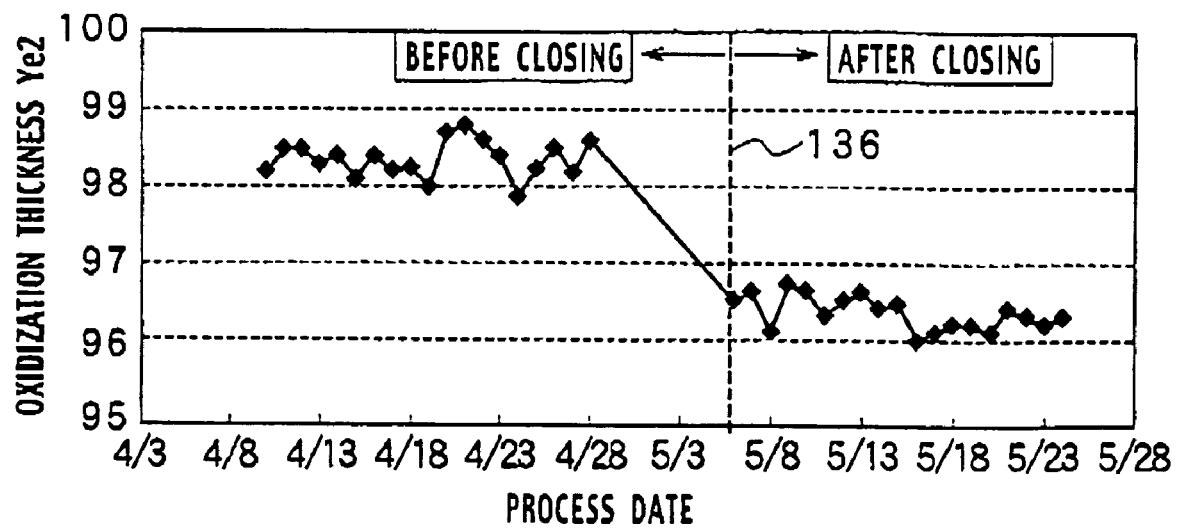
FIG. 13 is a schematic graph for explaining a method for the eighth embodiment.

As shown in FIG. 12, in the chronological graph of the quality inspection value Yq1, the horizontal axis shows the time and date of the processing, and the vertical axis shows the quality inspection value Yq1 of the etching rate (nm/seconds).

The wafer exhibiting the intersecting node surrounded by the circle 120 in FIG. 11 is applicable to the lot processed on February $4^{th}$ surrounded by the illustrated circle 130. Because the quality inspection value Yq1 has been flatly increasing since February $1^{st}$, the computer 11 increases the coefficient 'a' and updates the quality estimation value Yen of the etching rate.

The wafer exhibiting the intersecting node surrounded by the circle 121 in FIG. 11 is applicable to the lot processed on February $5^{th}$ surrounded by the illustrated circle 131. Because the quality inspection value Yq1 has been flatly increasing since February $4^{th}$, the computer 11 increases the coefficient 'a' and updates the quality estimation value Ye1n of the etching rate.

The wafer exhibiting the intersecting node surrounded by the circle 122 in FIG. 11 is applicable to the lot processed on February $7^{th}$ surrounded by the illustrated circle 182. Because the quality inspection value Yq1 has been falling precipitously since February $5^{th}$, the computer 11 reduces the coefficient 'b' and updates the quality estimation value Ye1n of the etching rate.

The wafer exhibiting the intersecting node surrounded by the circle 123 in FIG. 11 is applicable to the lot processed on February $13^{th}$ surrounded by the illustrated circle 133. Because the quality inspection value Yq1 has been flatly increasing since February $7^{th}$, the computer 11 passes on the decision to change the coefficient 'a' and because the quality inspection value Yq1n is located on the bottom side of the return line 126, the computer 11 reduces the coefficient 'a' and updates the quality estimation value Ye1n of the etching rate.

The wafer exhibiting the intersecting node surrounded by the illustrated circle 134 is applicable to the lot processed on February $22^{nd}$, and rises precipitously in proportion to the quality inspection value Yq1c of February $13^{th}$. This lot is an unexpected variation of the current equation (1), and the operation sequence of the computer 11 advances to the estimation equation updating S101 of FIG. 9 and stores new self-diagnosis parameters in the memory of the database 13b through the self-diagnosing apparatus 5d, advances to the mail sending S102 (shown FIG. 9) and notifies someone in charge of the process of a change in the quality estimation value estimation equation by mail.

In the eighth embodiment, the computer 11 is configured to change the self-diagnosis parameters of the database 13b while storing the quality estimation value Ye1c and the quality estimation value Yq1c corresponding to wafer numbers stored in the memory apparatus 12 in a memory corresponding to lots, and bring the quality estimation value Ye1n, of a plurality of wafers processed at a plurality of lots, closer to the quality inspection value Yq1n.

Further, based on the results of comparing the quality estimation value Ye1 of the etching rate with the quality inspection value Yq1, and also based on the chronological change of the quality inspection value Yq1c, the computer 11 executes the factor decision processing S97 (see FIG. 9), selects a factor of the equation (1), automatically updates changes of the coefficients 'a' and 'b', and after the equation (1) has been updated, a new value of the quality estimation value Ye1n is sought, making it possible to maintain optimum conditions.

Therefore, it is possible to prevent the processing apparatus's (14b) from making abnormal detection errors and overlooking errors that may occur by simply observing the quality estimation value Ye1 of the etching rate stated plainly, the processing apparatus's (14b) rate of operation is improved by preventing of abnormal detection errors, and the occurrence of sequence yield lots is prevented by preventing the of abnormal processes.

Below, out of the group of the processing apparatuses 14a, 14b, 14c, and 14d, the processing apparatus 14a, which has an oxidation heat element, will be described as an example.

The self-diagnosing apparatus 5a receives apparatus information such as the sequence amount of the gas supplied to the processing apparatus 14a (Oxygen O2, Nitrogen N2, Hydrogen H2, etc.), the electric power of the heater, the atmospheric pressure around the oxidation heat element, as apparatus information.

The received apparatus information is stored in the database 13a while the quality estimation value Ye2 is calculated using the next equation (2).

$$Ye2 = cX2 + dX3 + ex4 + F \quad (2)$$

The apparatus information X2 refers to the electric power of the heater, the apparatus information X3 refers to the sequence amount of oxygen, and the apparatus information X4 refers to the atmospheric pressure around the oxidation heat element. The computer 11 allocates self-diagnosis parameters to the coefficients 'c', 'd', 'e', and 'f'.

Although the oxidation film thickness of the wafer 17a is influenced by all of the parameters, the quality estimation value Ye2c of oxidation film thickness (nm) prior to a long holiday (vacation from April 13$^{th}$ to April 28$^{th}$, illustrated) is established in the range of '98' to '99', as shown in FIG. 18.

The processing apparatus 14a is stopped from the night of April 28$^{th}$ to the morning of May 6$^{th}$, and the quality estimation value Ye2c of oxidation film thickness (nm) after a long holiday (from May 6$^{th}$, illustrated) moves to in the range of '96' to '97', doted Line 186 which is a long change.

Figure 14:
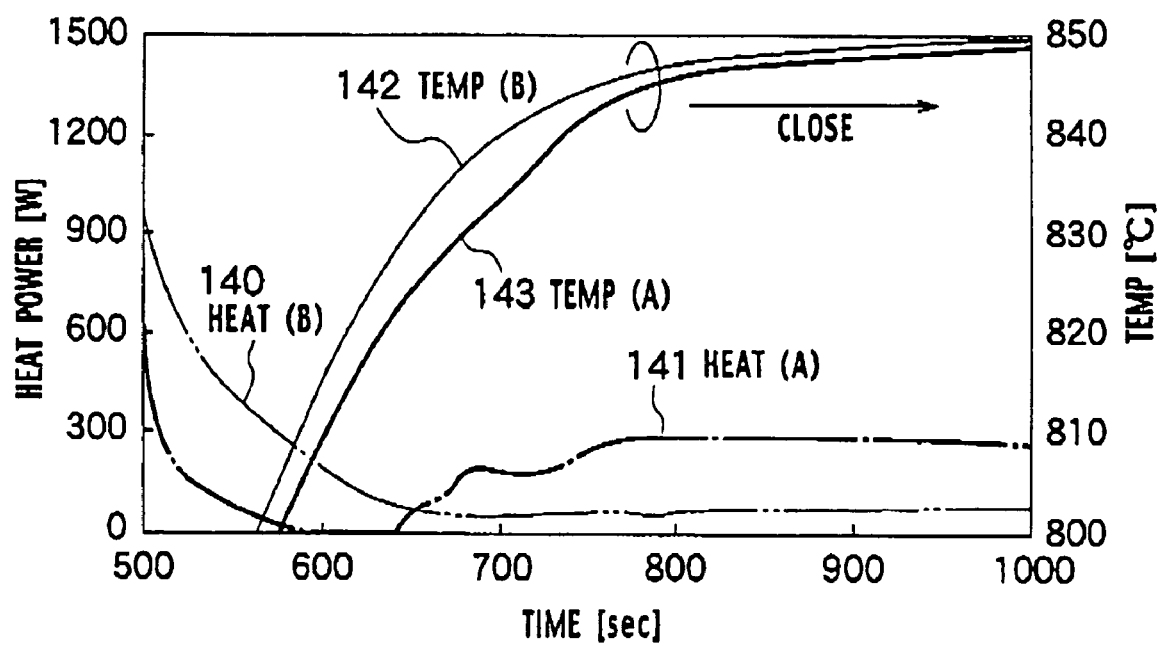
FIG. 14 is a schematic graph for explaining a method for the eighth embodiment.

The self-diagnosing apparatus 6a receives apparatus information of the electric power of the heater (W) from the processing apparatus 14a, as shown in FIG. 14. A pre-long-holiday heater electric power 140 is 900 W at 500 seconds from putting the processing apparatus 14a in operation, 200 W at 600 seconds from putting the processing apparatus 14a in operation, and below 100 W at and above 650 seconds from putting the processing apparatus 14a in operation.

In respect to this, a post-long holiday heater electric power 141 is 600 W after 500 seconds from putting the processing apparatus 14a in operation, 0 W after 600 seconds from putting the processing apparatus 14a in operation, after 650 seconds from 0 W putting the processing apparatus 14a in operation, the post-long holiday heater electric power 141 rises from 0 W to 200 W. At and after 750 seconds from putting the processing apparatus 14a in operation, the post-long holiday heater electric power 141 is from 150 W to 300 W. Compared with the pre-long-holiday heater electric power 140, the post-long holiday heater electric power 141 is different in that the post-long holiday heater electric power 141 falls until after 650 seconds from putting the processing apparatus 14a in operation, and rises after 700 seconds from putting the processing apparatus 14a in operation.

The processing apparatus 14a monitors the temperature increase of the oxidation heat element. A pre-long-holiday temperature 142 rises to 800 degrees Celsius 560 seconds from putting the processing apparatus 14a in operation, rises to 840 degrees Celsius 700 seconds from putting the processing apparatus 14a in operation, and fluctuates between 840 and 850 degrees Celsius at and after 800 seconds from putting the processing apparatus 14a in operation. A post-long-holiday temperature 148 rises to 800 degrees Celsius 570 seconds from putting the processing apparatus 14a in operation, rises to 830 degrees Celsius 700 seconds from putting the processing apparatus 14a in operation, and fluctuates between 840 and 850 degrees Celsius at and after 800 seconds from putting the processing apparatus 14a in operation. Compared with the pre-long holiday temperature 142, the temperature increase curve of the post-long-holiday temperature 143 is lower.

Because the self-diagnosing apparatus 5a received the heater electric power of the apparatus information X2, which differs before and after the long holiday, it can be understood that the temperature increase curve underwent a variation before and after the long holiday.

The computer 11 executes quality estimation comparison processing and compares the quality inspection value Yq2, which is based on the (post long holiday) film thickness of the wafer 17a actually measured by the processing apparatus 19a with the (post long holiday) quality estimation value Ye2 of the oxidation film of the wafer 17a received from the self-diagnosing apparatus 5a, and determines the values as being 'non-conforming'.

The computer 11 executes factor-deciding processing and increases the coefficient 'c' of the equation (2). Because of the automatic generation of the self-diagnosis parameters corresponding to the time after a long holiday, it is possible to increased the reliability of the quality estimation value Ye2 of the oxidation film thickness of the wafer 17a from then on by previously acquiring (for example, unscheduled acquisition several times per year) a change of state of the heater of the oxidation heat element before and after a long holiday.

The computer 11 is configured to give notice of the change of the equation (2) in regard to the self-diagnosing apparatus 5a, stores a new equation (2) in the database on the self-diagnosing apparatus 5a side, and also store changes to the equation (2) in the memory device 12. Further, notification of a change in the equation (2) is executed by mail transmission, in which the computer 11 is configured to automatically send a notification email to a person in charge of the process.

In this manner, by regularly comparing the quality inspection value Yq2, which is based on the film thickness of the wafer 17a with the quality estimation value Ye2 of the oxidation film thickness of the wafer 17a calculated by the self-diagnosing apparatus 5a, it is possible to acquire (for example, unscheduled acquisition several times per year) a change of the state of the heater before and after a long holiday, and it is also possible to prevent abnormalities of the quality estimation value Ye2 of the oxidation film thickness of the wafer 17a.

The previously explained operation and technological advantages of the embodiment of the present invention is merely a summary of the operations and technological advantages occurring of the present invention.

Those operations and technological advantages set forth in the embodiments herein do in not limit the present invention.

The functions and effects described in the examples of the present invention are not limited to ones described in the embodiment of the present invention.

What is claimed is:

1. A semiconductor device manufacturing system comprising:
   a processing apparatus to perform a process on a semiconductor substrate;
   a process control apparatus controlling operation of the processing apparatus by transmitting a start signal and a stop signal to the processing apparatus;
   a real time simulator configured to monitor a state of the processing apparatus during processing of the semiconductor substrate, integrate internal information of the processing apparatus from the start signal to the stop signal and internal information of the processing apparatus after the stop signal, in response to the start signal and the stop signal to the processing apparatus, execute a simulation of a semiconductor manufacturing process, and estimate a progress of the process, wherein in response to a start signal transmitted from the process control apparatus to the processing apparatus, the real time simulator initiates calculation of the quality of the semiconductor device, based on the internal information transmitted from the processing apparatus in real time, and wherein the real time simulator includes an oxide film thickness calculation section adapted to calculate an oxide film thickness continuously in real time based on apparatus internal information from a time of stopping an oxidation process, until a predetermined time elapses.

2. The semiconductor device manufacturing system of claim 1, wherein a calculated value of the oxide film thickness by the oxide film thickness calculation section is integrated over a period from a time of the arrival of a start signal, followed by an arrival of a stop signal adapted to completing an oxidation process, to a time when the predetermined time elapses.

3. The semiconductor device manufacturing system of claim 1, wherein chamber number information is added to equipment engineering system data to be processed by a computer and, in a case where an oxidation heat element includes a plurality of chambers, different pieces of equipment engineering system data are respectively related to the plurality of chambers.

4. The semiconductor device manufacturing system of claim 1, wherein the oxide film thickness calculation section is provided inside of the real time simulator.

5. The semiconductor device manufacturing system of claim 1, wherein the real time simulator integrates with the internal information from the arrival time of a processing stop signal transmitted from the processing control device, and executes the simulation of a semiconductor manufacturing process.

6. The semiconductor device manufacturing system of claim 1, wherein the real time simulator is configured to monitor an end point appearance region of the semiconductor substrate, and estimates progress of the semiconductor substrate.

7. The semiconductor device manufacturing system of claim 1, wherein the process control apparatus is configured to receive a process start command from a computer different from the real-time simulator, and to transmit a processing start signal and a processing stop signal to the processing apparatus.

8. The semiconductor device manufacturing system of claim 7, wherein the real time simulator is configured to a presumed advance result of processing of the semiconductor substrate to the computer.

9. The semiconductor device manufacturing system of claim 1, wherein the processing apparatus includes at least one of:
a film formation processing apparatus for conducting a film formation process;
an impurity diffusion processing apparatus;
a CVD thin film deposition apparatus;
a heating heat element apparatus for reflowing a PSG film, a BSG film, and a BPSG film;
a thermochemical reaction processing apparatus for adjusting an amount of densification in a CVD oxide film, and a thickness of a silicide film;
a sputtering apparatus and a vacuum vapor deposition apparatus for depositing a metal wiring layer;
a plating apparatus for plating;
a CMP apparatus for chemically and mechanically polishing the semiconductor substrate;
a dry or wet etching apparatus for etching the surface of the semiconductor substrate;
a spin coating apparatus related to a photolithography process;
an exposure processing apparatus such as a stepper; and
a wire bonding apparatus for bonding electrodes of a semiconductor device diced into a chip to a lead frame.

10. A method for manufacturing a semiconductor device, comprising:
processing a semiconductor substrate by a processing apparatus;
controlling operation of the processing apparatus by transmitting a start signal and a stop signal to the processing apparatus by a process control apparatus; and
monitoring a state of the processing apparatus during processing of the semiconductor substrate, integrating internal information of the processing apparatus from the start signal to the stop signal and internal information of the processing apparatus after the stop signal, in response to the start signal and the stop signal to the processing apparatus, executing a simulation of a semiconductor manufacturing process, and estimating processing progress of the semiconductor substrate by the processing apparatus, wherein in response to a start signal transmitted from a process control apparatus to the processing apparatus, a real time simulator initiates calculation of the quality of the semiconductor device, based on the internal information transmitted from the processing apparatus in real time, and wherein the real time simulator includes an oxide film thickness calculation section adapted to calculate an oxide film thickness continuously in real time based on apparatus internal information from a time of stopping an oxidation process, until a predetermined time elapses.

11. The method of claim 10, wherein a calculated value of the oxide film thickness by the oxide film thickness calculation section is integrated over a period from a time of an arrival of a start signal, followed by an arrival of a stop signal adapted to completing an oxidation process, to a time when the predetermined time elapses.

12. The method of claim 10, wherein chamber number information is added to equipment engineering system data to be processed by a computer and, in a case where an oxidation heat element includes a plurality of chambers, different pieces of equipment engineering system data are respectively related to the plurality of chambers.

13. The method of claim 10, wherein the oxide film thickness calculation section is provided inside of the real time simulator.

14. The method of claim 10, wherein the process processing simulation is integrated with internal information from an arrival time of a processing stop signal transmitted from a processing control device.

15. The method of claim 10, wherein the simulation is monitoring an end point appearance region of the semiconductor substrate, and estimating a progress of the semiconductor substrate by the process.

16. The method of claim 15, wherein the process performed on the semiconductor substrate is an etching process.

17. The method of claim 10, wherein the processing apparatus includes at least one of:

a film formation processing apparatus for conducting a film formation process;
an impurity diffusion processing apparatus;
a CVD thin film deposition apparatus;
a heating heat element apparatus for reflowing a PSG film, a BSG film, and a BPSG film;
a thermochemical reaction processing apparatus for adjusting the amount of densification in a CVD oxide film, and the thickness of a silicide film;
a sputtering apparatus and a vacuum vapor deposition apparatus for depositing a metal wiring layer;
a plating apparatus for plating;
a CMP apparatus for chemically and mechanically polishing a semiconductor substrate;
a dry or wet etching apparatus for etching the surface of a semiconductor substrate;
a spin coating apparatus related to a photolithography process;
an exposure processing apparatus such as a stepper; and
a wire bonding apparatus for bonding electrodes of a semiconductor device diced into a chip to a lead frame.

* * * * *